(12) United States Patent
Taylor

(10) Patent No.: US 7,987,611 B2
(45) Date of Patent: Aug. 2, 2011

(54) SELF-EXTENDING ELONGATE MEMBER AND USE THEREOF

(76) Inventor: Curtis Patrick Taylor, Chagrin Falls, OH (US)

( * ) Notice: Subject to any disclaimer, the term of this patent is extended or adjusted under 35 U.S.C. 154(b) by 0 days.

(21) Appl. No.: 12/511,287

(22) Filed: Jul. 29, 2009

(65) Prior Publication Data

US 2010/0024234 A1     Feb. 4, 2010

Related U.S. Application Data

(60) Provisional application No. 61/084,399, filed on Jul. 29, 2008.

(51) Int. Cl.
*G01B 3/10* (2006.01)
(52) U.S. Cl. .............................. 33/757; 33/458; 33/755
(58) Field of Classification Search .................... 33/757, 33/458, 755, 492, 810, 483
See application file for complete search history.

(56) References Cited

U.S. PATENT DOCUMENTS

| | | | | |
|---|---|---|---|---|
| 165,383 A * | 7/1875 | Tilney | ................................ | 33/16 |
| 360,247 A | 3/1887 | Reichenbach | | |
| 376,558 A * | 1/1888 | Stahl | ................................ | 33/15 |
| 449,034 A * | 3/1891 | Burrowes | ........................ | 33/458 |
| 734,014 A * | 7/1903 | Traut | ..................... | 33/557 |
| 832,382 A * | 10/1906 | Hay, Jr. | .......................... | 33/492 |
| 902,306 A | 10/1908 | Leahy | | |
| 942,583 A * | 12/1909 | Neeld | ............................ | 403/111 |
| 2,307,395 A | 1/1943 | Dinhofer | | |
| 2,319,724 A * | 5/1943 | Dinhofer | ........................ | 33/757 |
| 2,505,437 A * | 4/1950 | Skolnick | ..................... | 33/27.02 |
| 2,555,741 A * | 6/1951 | Greene | ........................... | 33/771 |
| 2,698,484 A * | 1/1955 | Zern et al. | ..................... | 33/27.01 |
| 2,795,050 A | 6/1957 | Van Fleet | | |
| 3,032,151 A | 5/1962 | Allen et al. | | |
| 3,393,454 A * | 7/1968 | Creighton | .................... | 33/27.03 |
| 3,792,511 A * | 2/1974 | Evans | .............................. | 33/458 |
| 4,275,503 A | 6/1981 | Bergkvist | | |
| 4,352,244 A | 10/1982 | Tomuro | | |
| 4,411,072 A | 10/1983 | Rutty et al. | | |
| 4,429,462 A | 2/1984 | Rutty et al. | | |
| 4,930,227 A | 6/1990 | Ketchpel | | |
| 5,063,686 A | 11/1991 | Peloquin | | |
| 5,299,358 A | 4/1994 | Reuter | | |
| 5,458,946 A | 10/1995 | White, Jr. | | |
| 5,505,086 A | 4/1996 | Sano et al. | | |
| 5,528,938 A | 6/1996 | Sano et al. | | |
| 5,953,826 A | 9/1999 | Goodyer et al. | | |
| 6,067,722 A | 5/2000 | Goodyer et al. | | |
| 6,237,239 B1 | 5/2001 | Miyazaki | | |
| 6,324,769 B1 | 12/2001 | Murray | | |

(Continued)

*Primary Examiner* — Christopher W Fulton
(74) *Attorney, Agent, or Firm* — Calfee, Halter & Griswold LLP

(57) ABSTRACT

A measuring device is provided that may be selectively configured between an extended condition and a collapsed condition. The device includes a first member, second member, flexible housing, and securing means. Each member has a proximal end, distal end, and convex surface. The convex surfaces are flexible such that the members may bend about a bending axis of the device and resilient such that the convex surfaces are biased toward their stable convex shape and the device is biased toward the extended condition. The first and the second members are disposed within the flexible housing to form a covered pair having a proximal end and a distal end. The apex of the convex surface of the first member is opposite the apex of the convex surface of the second member when the members are disposed within the flexible housing. The securing means secures the measuring device in the collapsed condition.

25 Claims, 37 Drawing Sheets

U.S. PATENT DOCUMENTS

| | | |
|---|---|---|
| 6,349,482 B1 | 2/2002 | Gilliam |
| 6,367,161 B1 | 4/2002 | Murray et al. |
| 6,473,986 B1 | 11/2002 | Sun |
| 6,510,622 B2 * | 1/2003 | Laughlin et al. ................ 33/770 |
| 6,598,310 B1 | 7/2003 | Odachowski |
| 6,643,947 B2 | 11/2003 | Murray |
| 6,651,354 B1 | 11/2003 | Odachowski |
| 6,662,463 B2 | 12/2003 | Lee |
| 6,860,031 B2 | 3/2005 | Odachowski |
| 6,907,676 B2 | 6/2005 | Liao |
| 6,957,498 B2 * | 10/2005 | Tsai ................................ 33/610 |
| 6,959,500 B2 | 11/2005 | Liao |
| 7,007,400 B2 | 3/2006 | Liao |
| 7,062,859 B1 | 6/2006 | Revnell |
| 7,062,862 B2 | 6/2006 | Wheaton |
| 7,096,596 B2 | 8/2006 | Hernandez, Jr. et al. |
| 7,107,698 B2 | 9/2006 | Liao |
| 7,159,331 B2 | 1/2007 | Critelli et al. |
| 7,174,654 B2 | 2/2007 | Hernandez, Jr. et al. |
| RE39,719 E | 7/2007 | Murray |
| 7,444,759 B1 * | 11/2008 | Fleming et al. ................. 33/771 |
| 7,698,832 B2 * | 4/2010 | Sacks ............................... 33/755 |
| 2002/0129509 A1 | 9/2002 | Evans, III |
| 2003/0172539 A1 | 9/2003 | Lee |
| 2004/0250437 A1 | 12/2004 | Odachowski |
| 2005/0022412 A1 | 2/2005 | Liao |
| 2005/0022413 A1 | 2/2005 | Liao |
| 2006/0059703 A1 | 3/2006 | Hernandez, Jr. et al. |
| 2006/0168838 A1 | 8/2006 | Liao |
| 2006/0288599 A1 * | 12/2006 | Hajianpour ..................... 33/755 |
| 2009/0320307 A1 * | 12/2009 | Richter ............................ 33/512 |

* cited by examiner

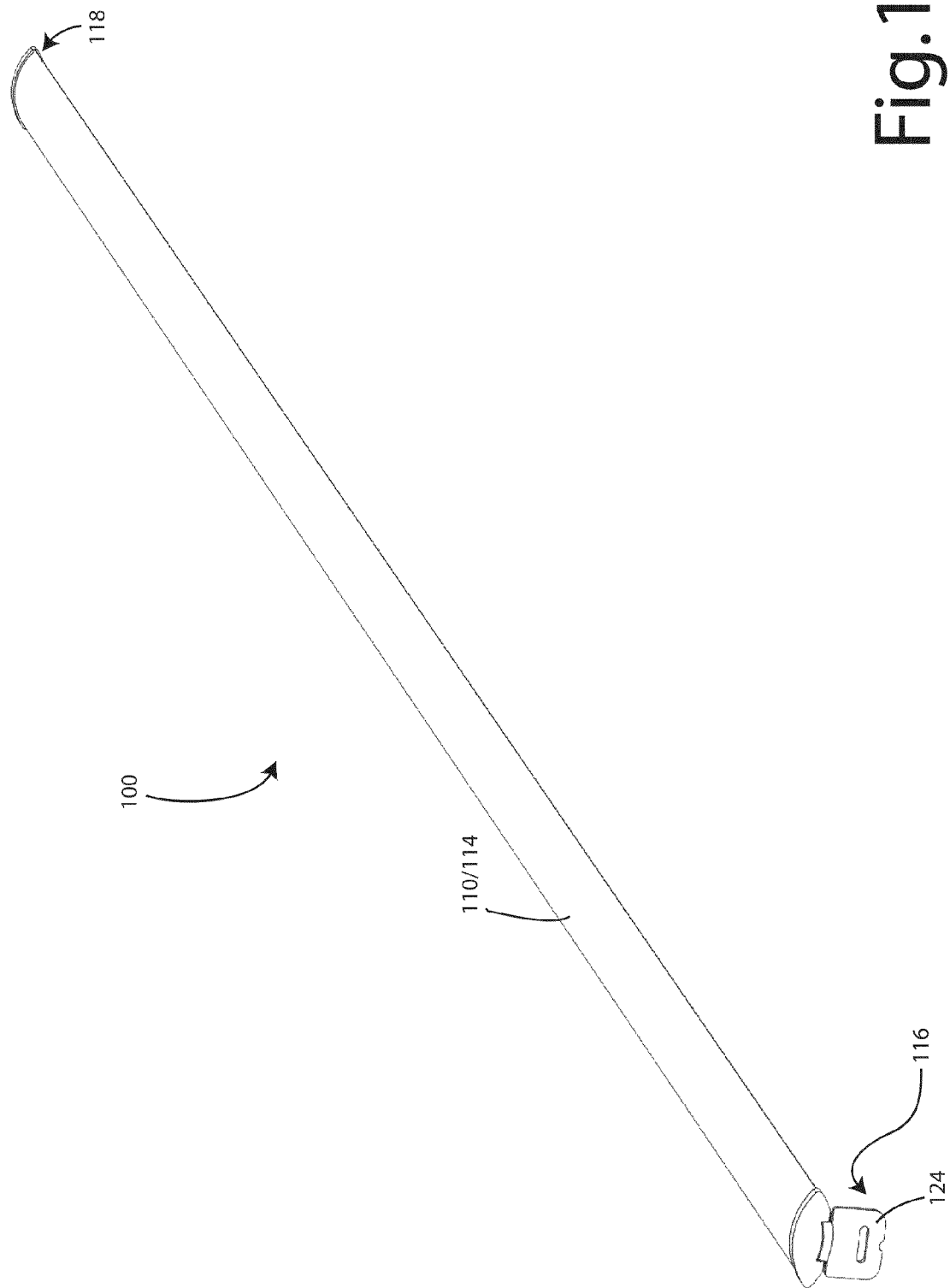

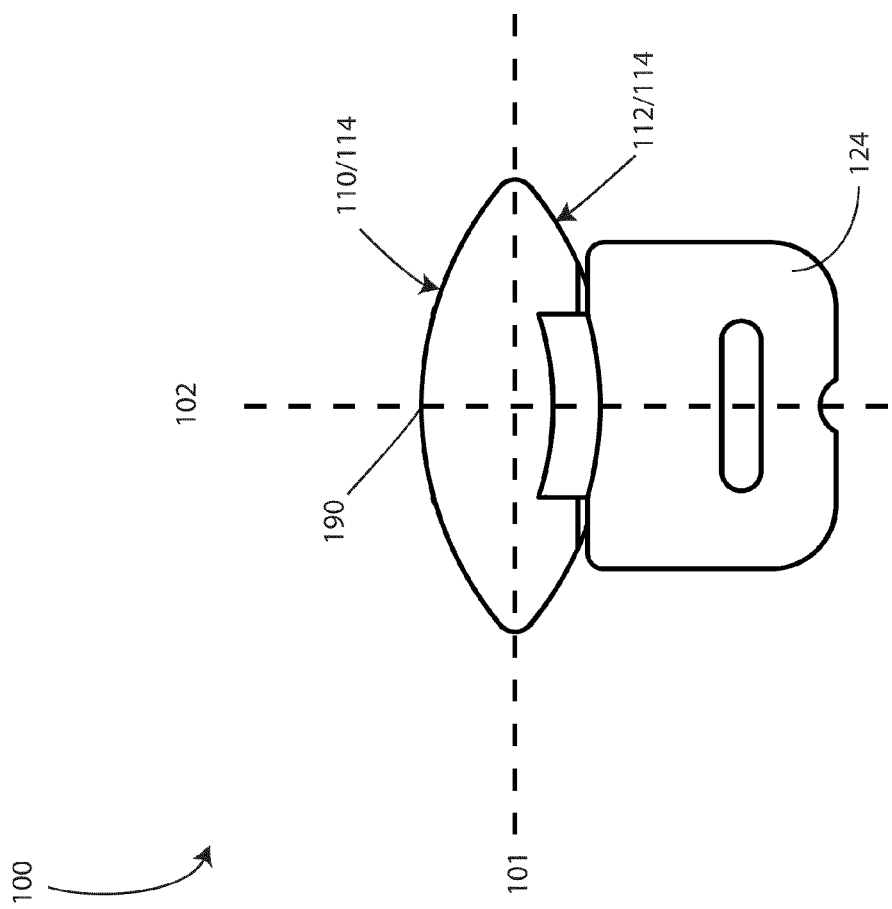

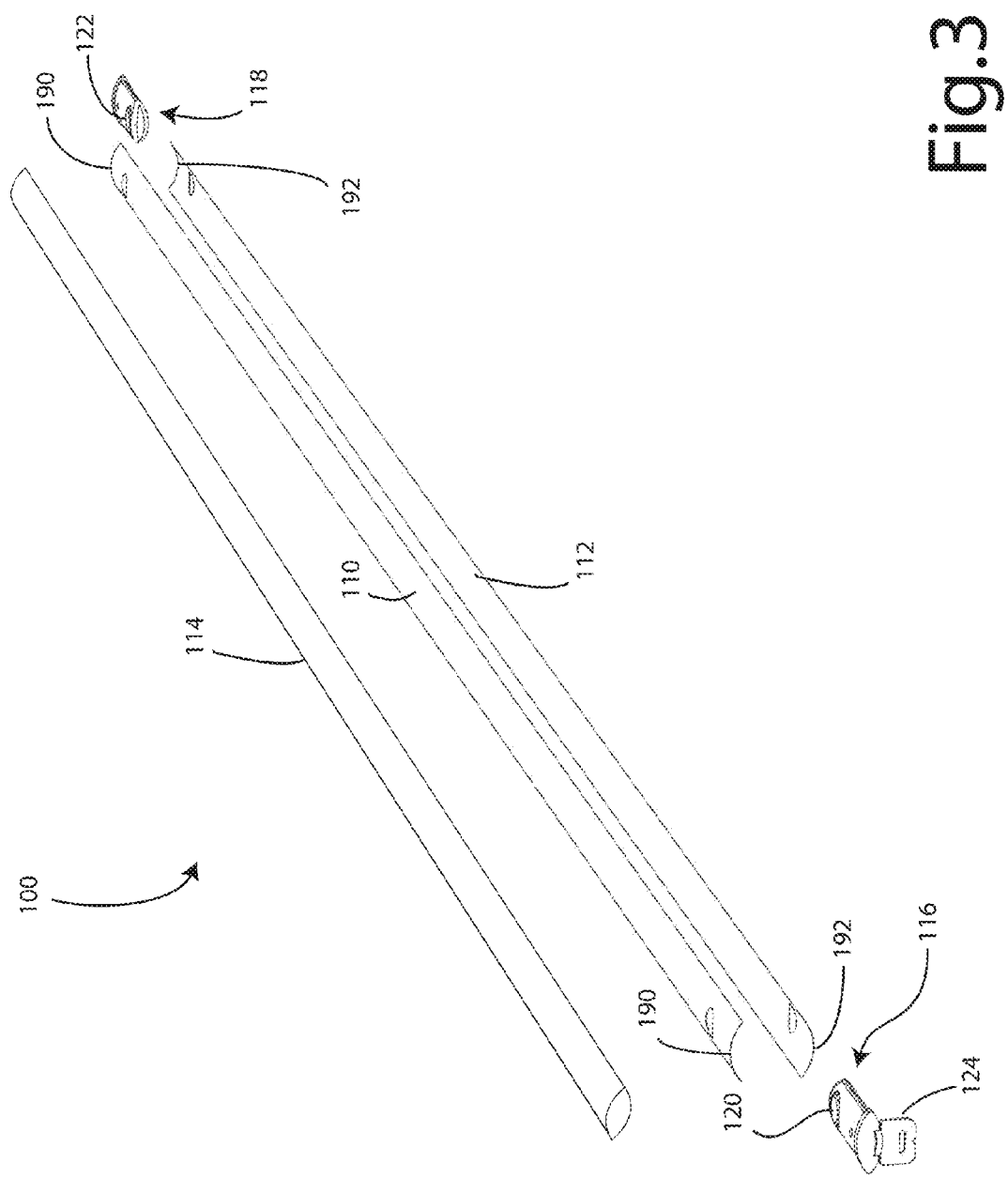

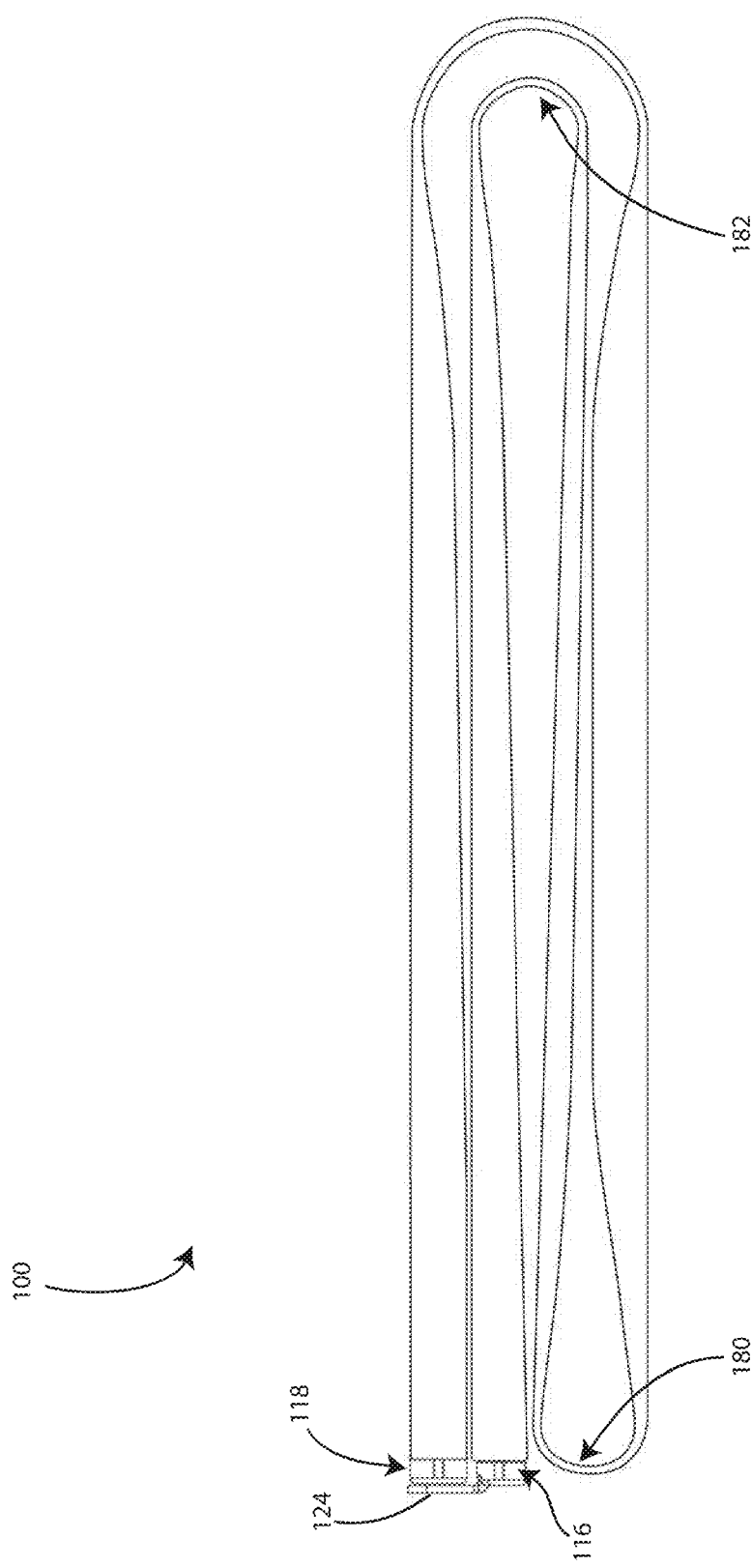

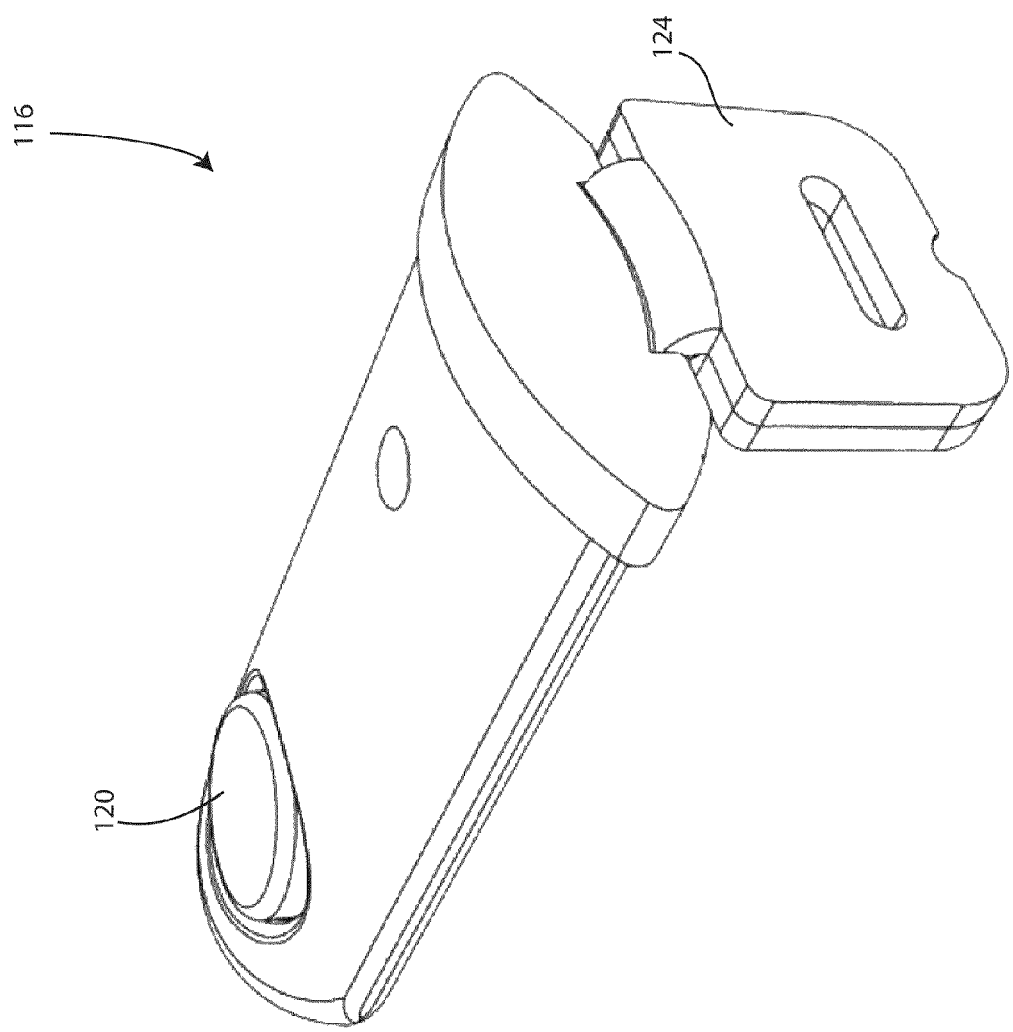

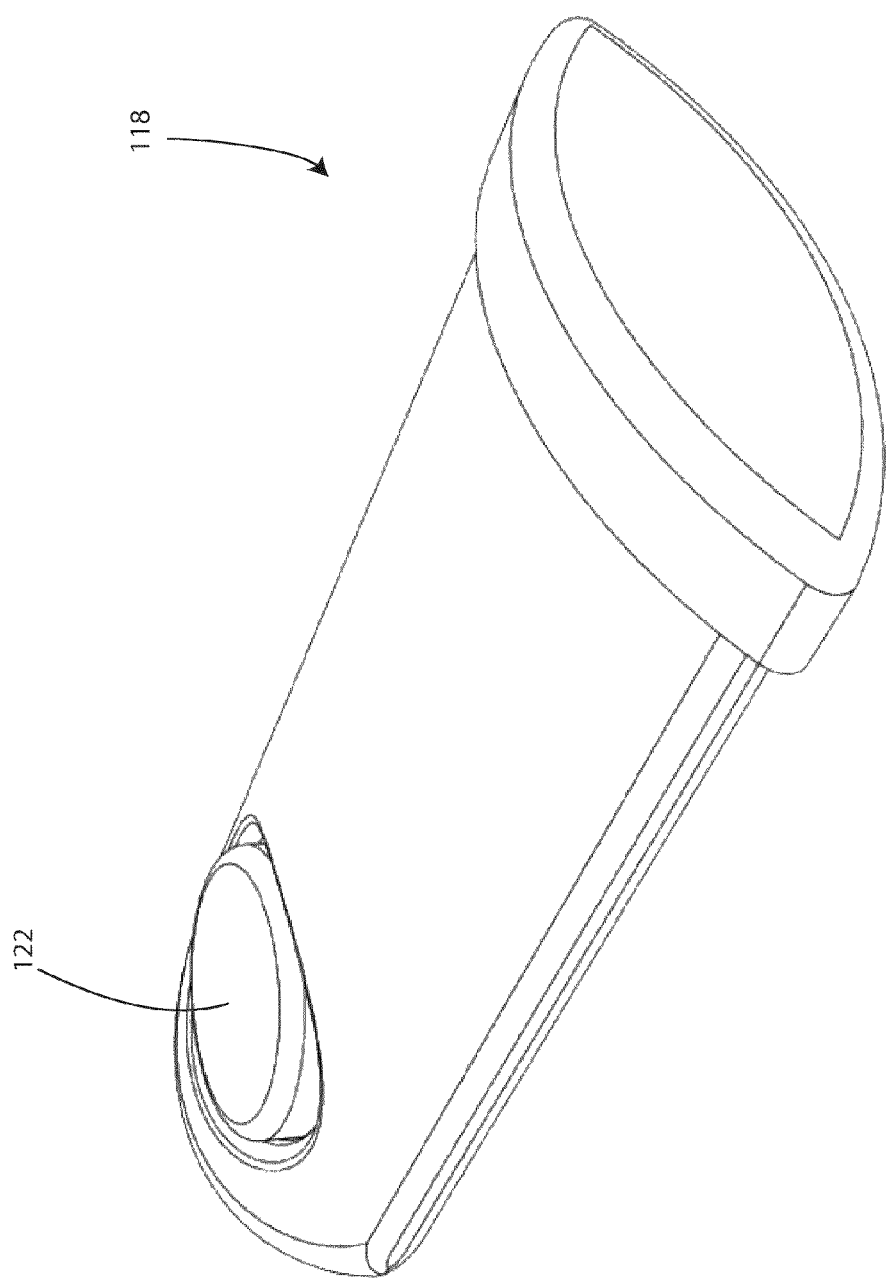

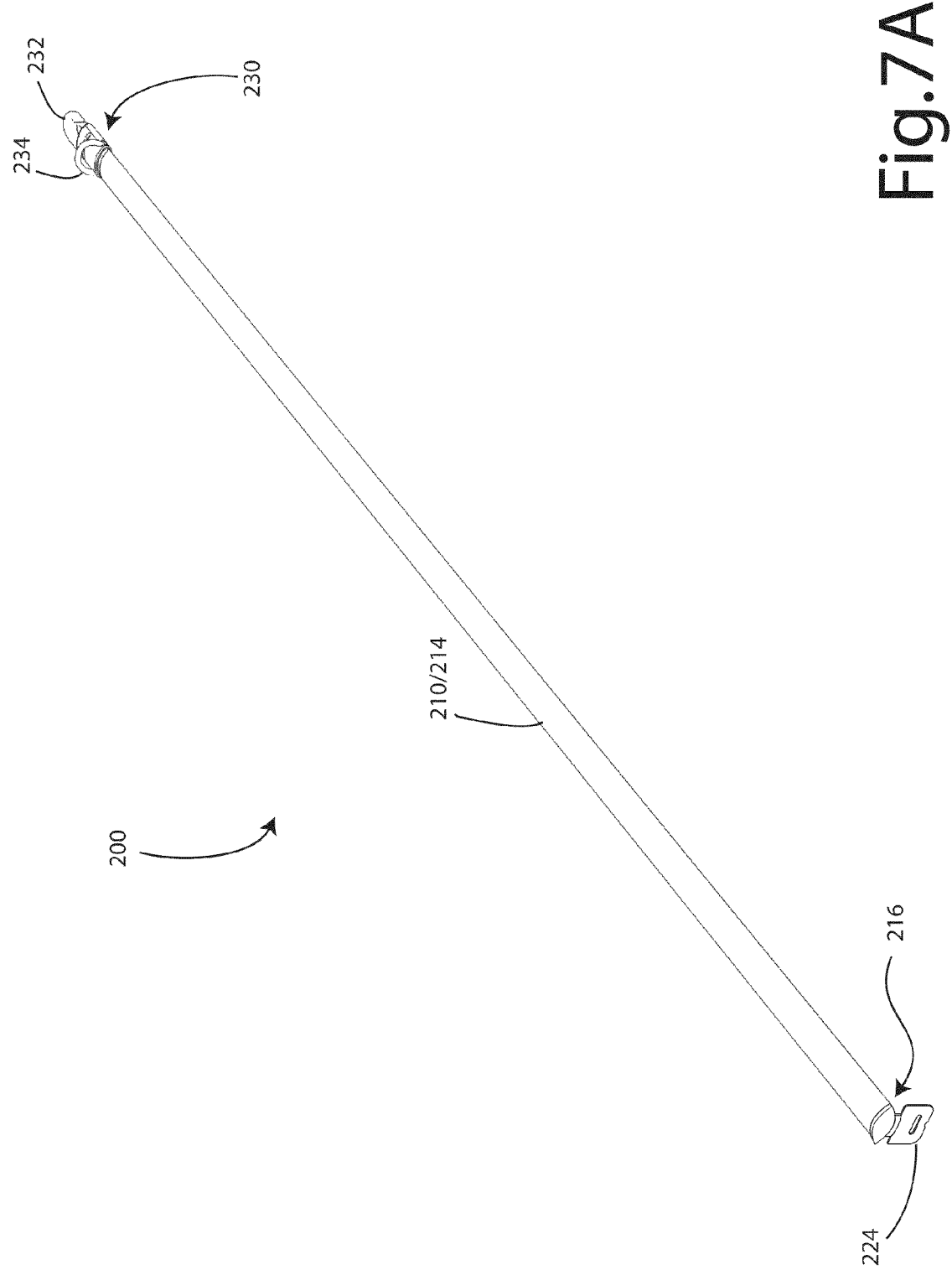

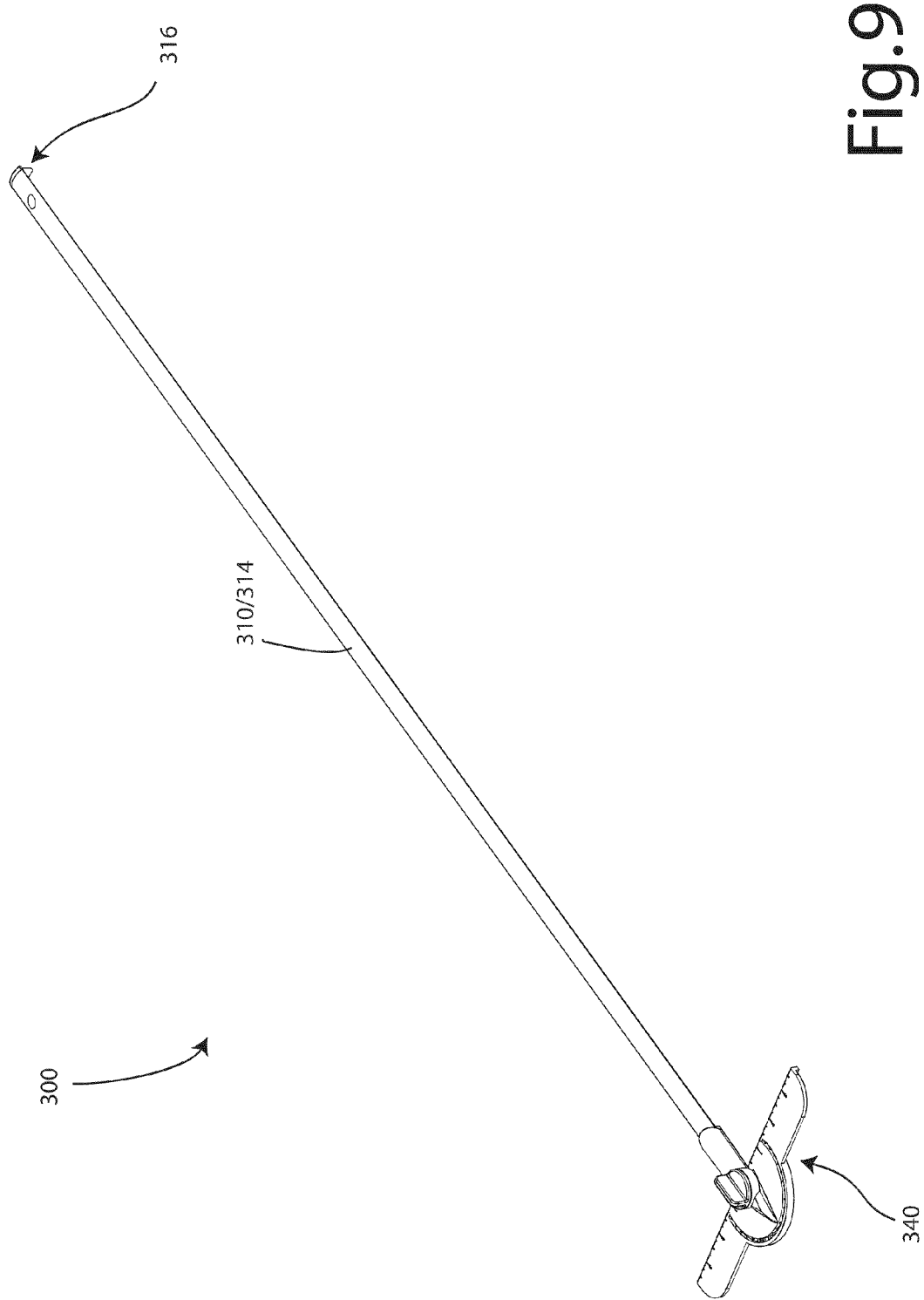

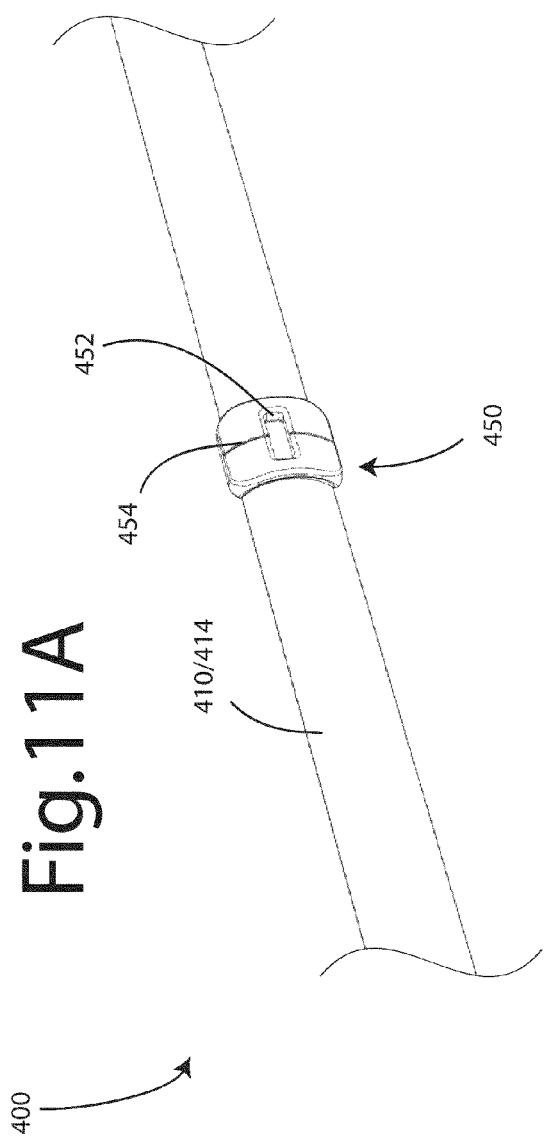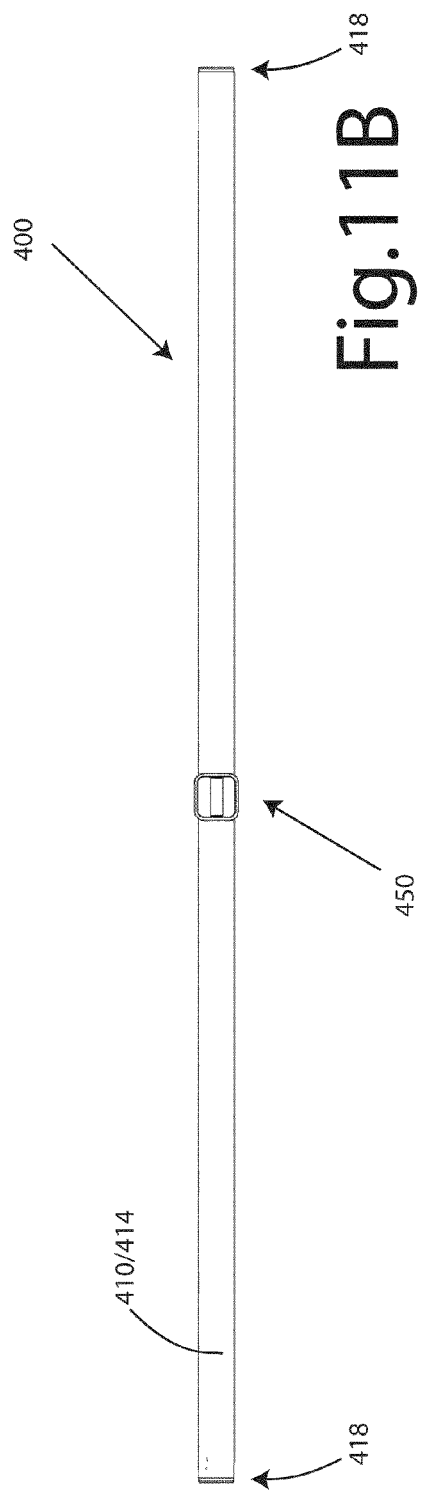

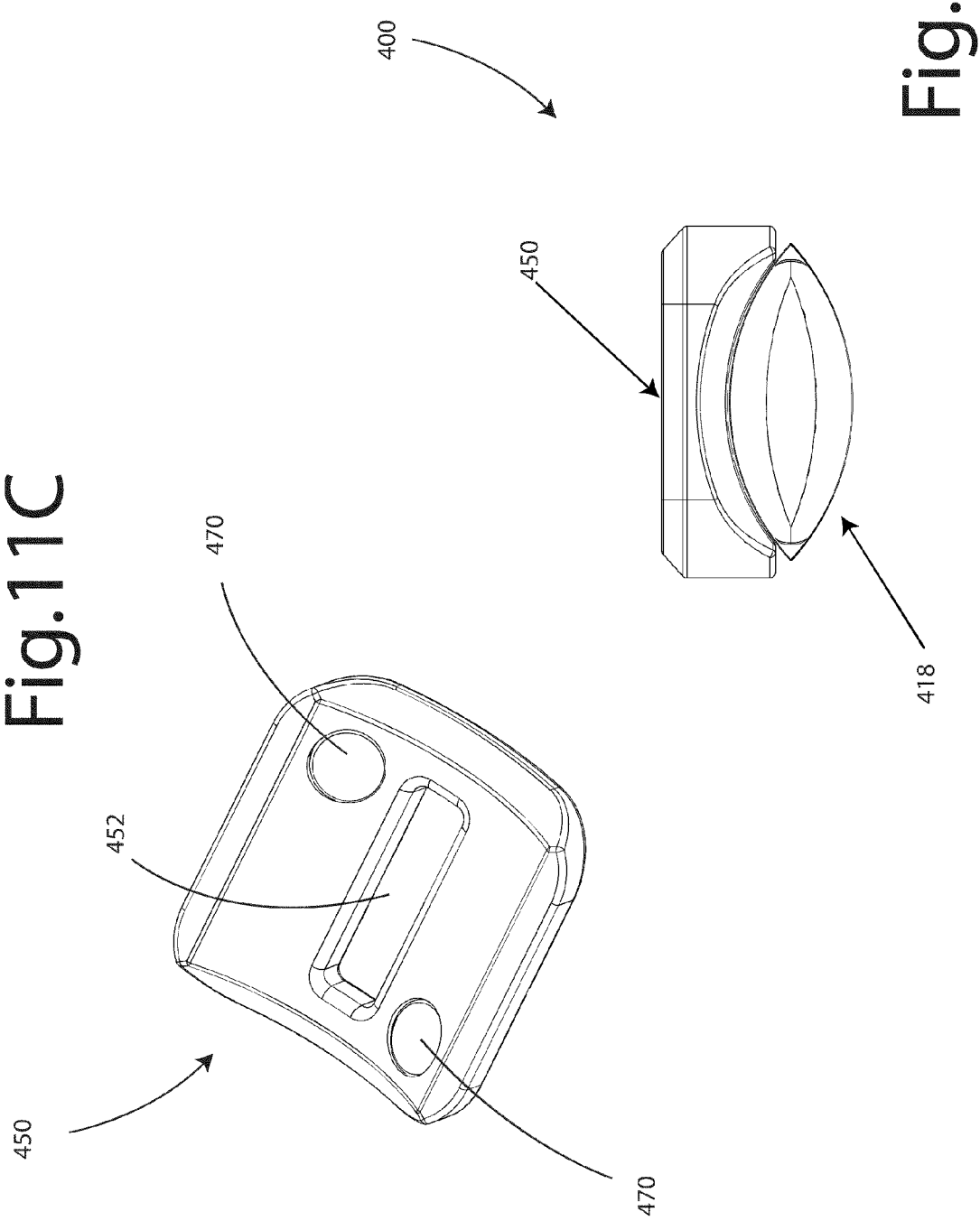

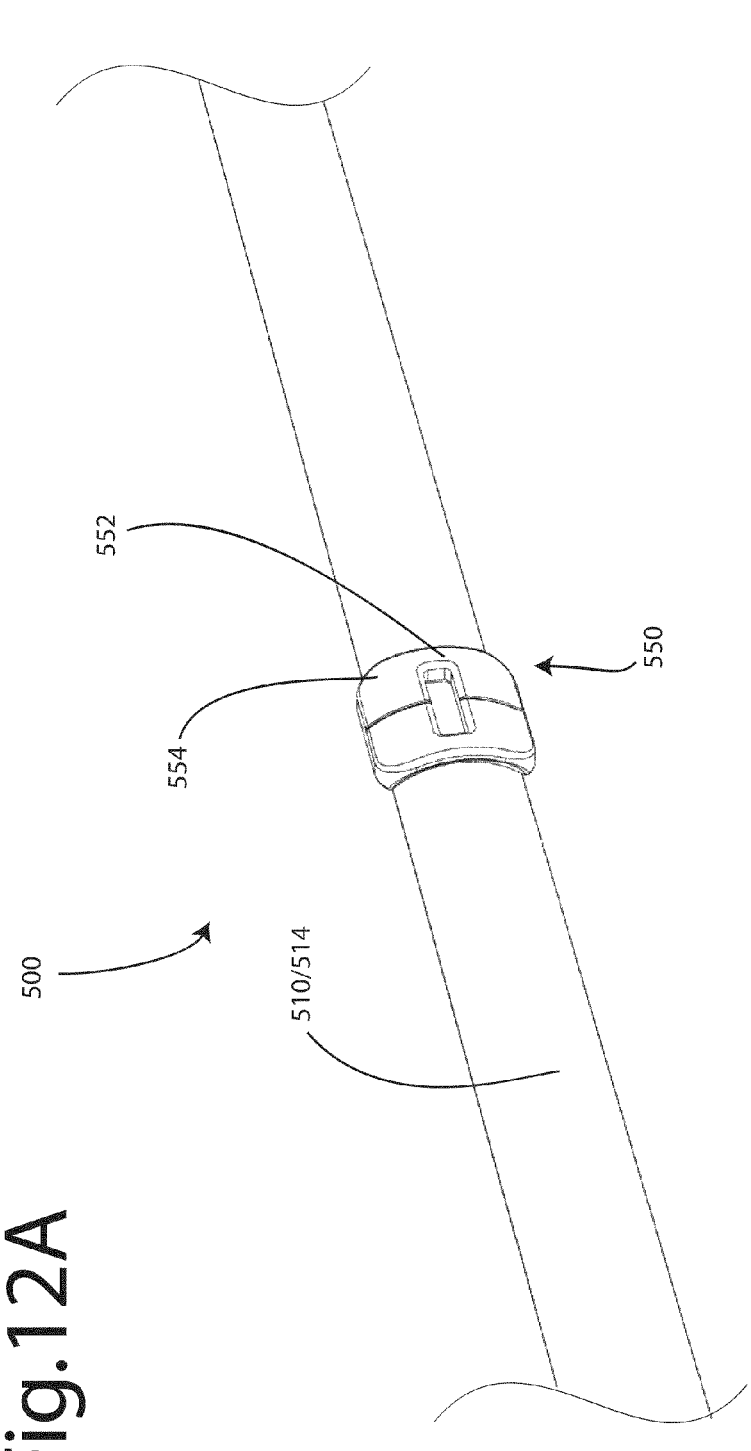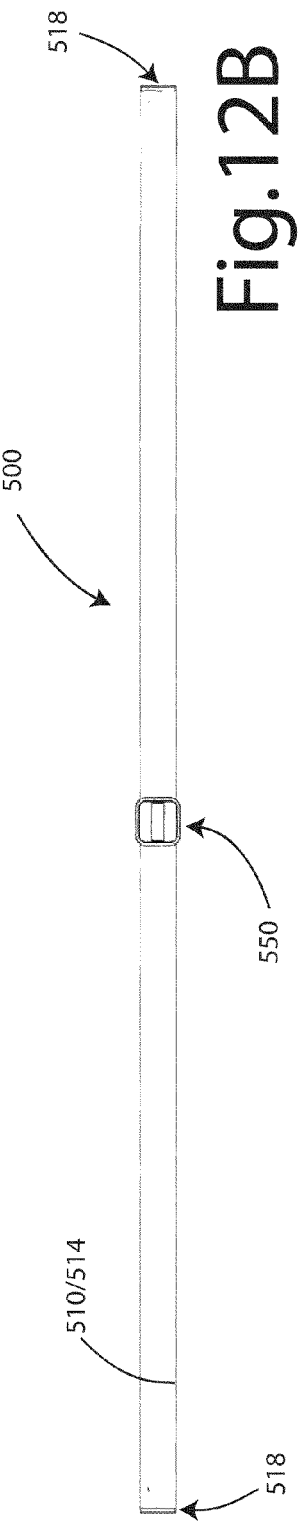

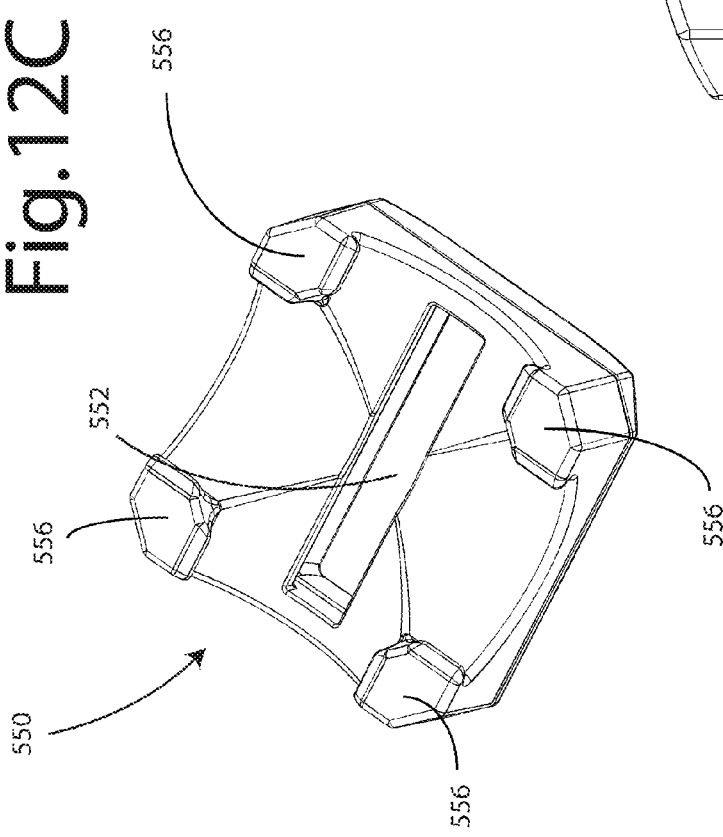
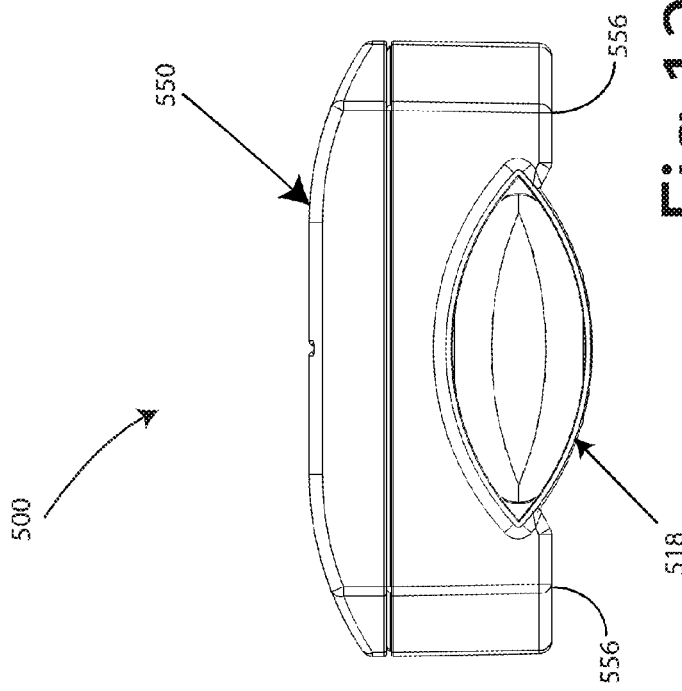

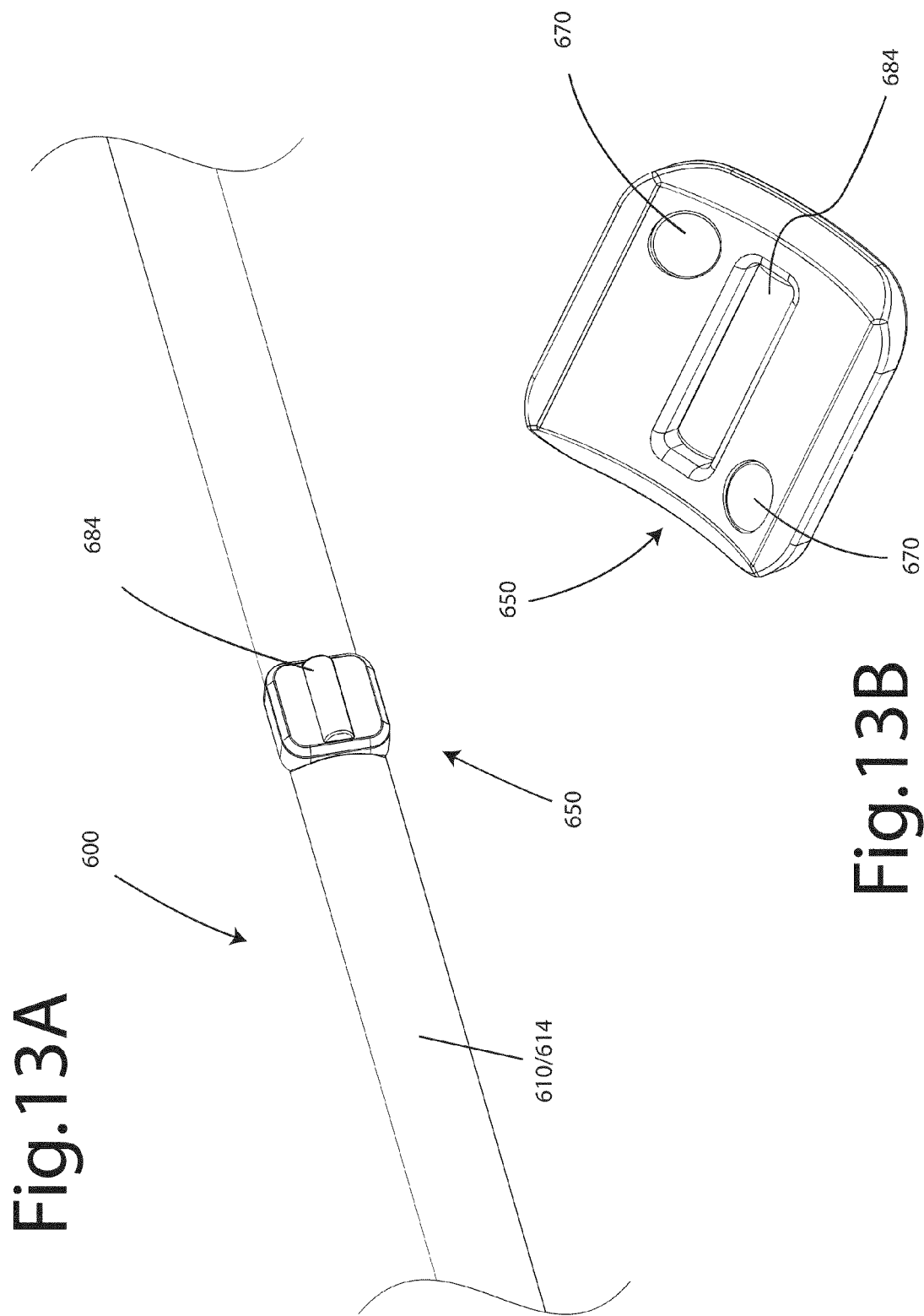

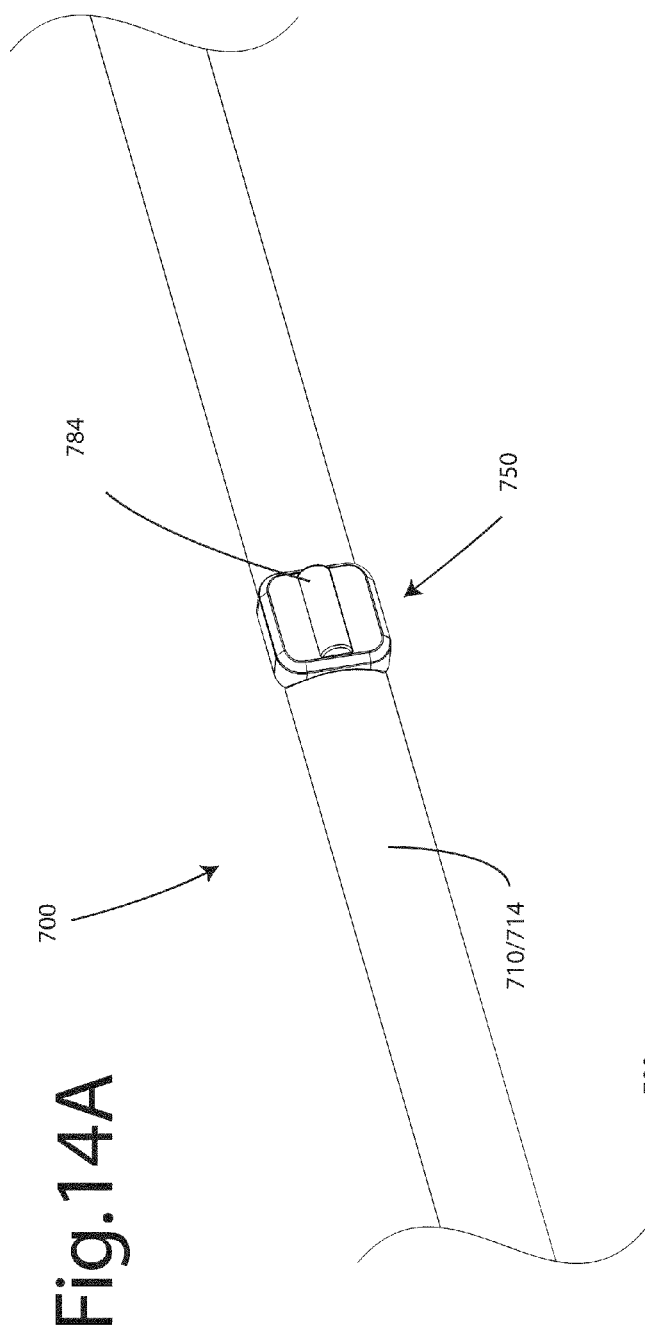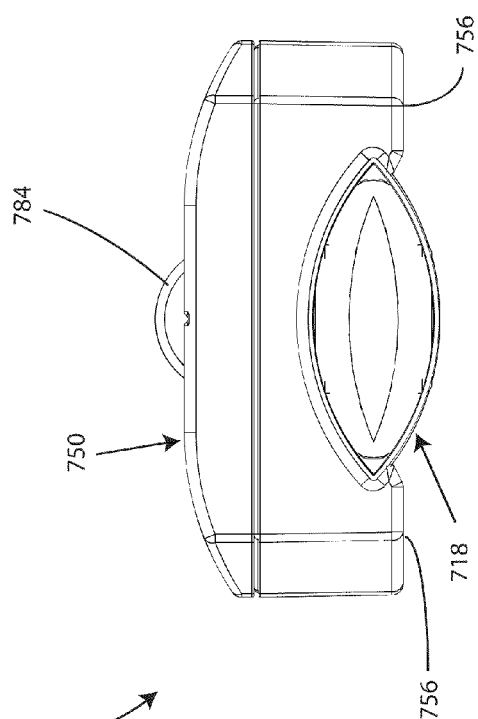

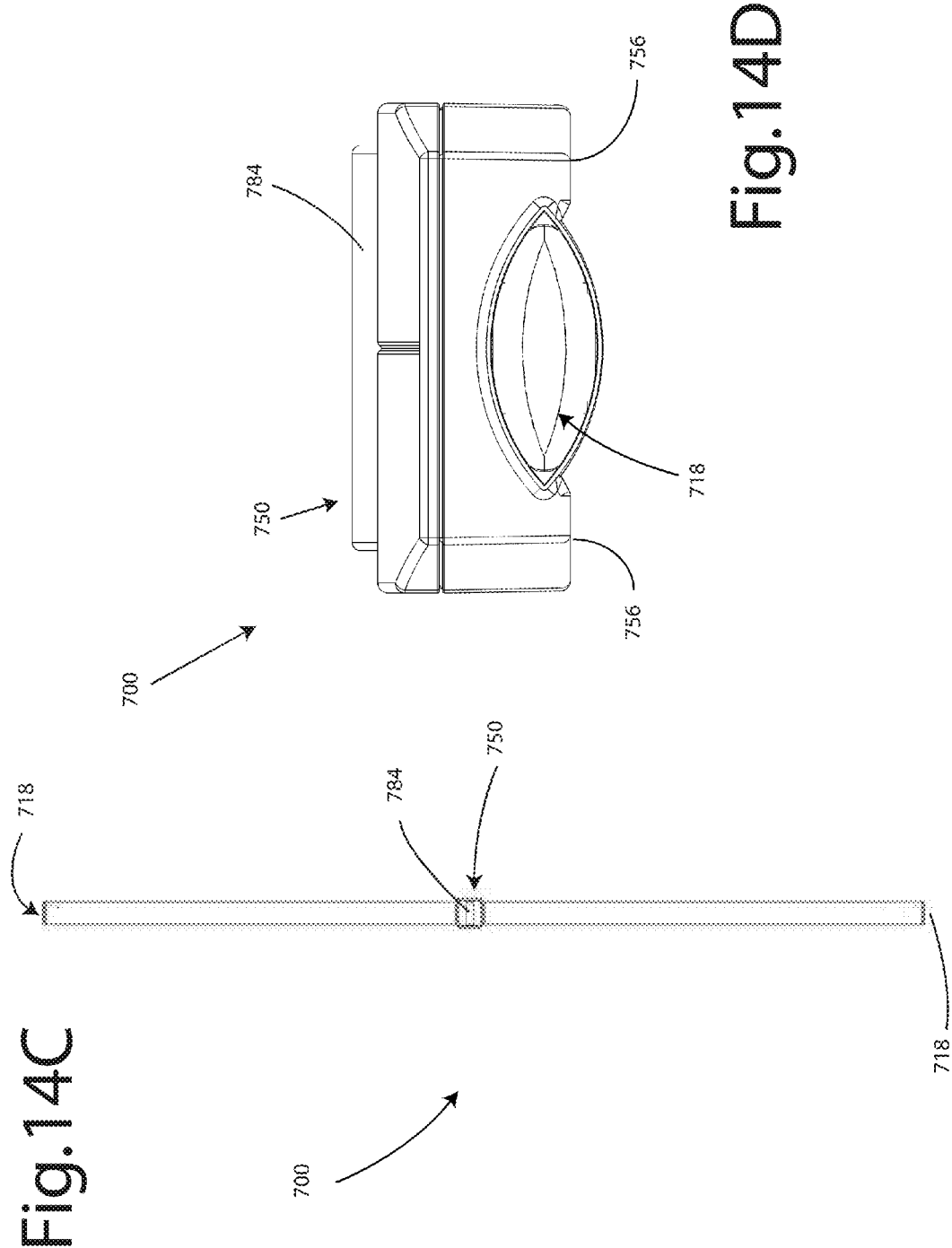

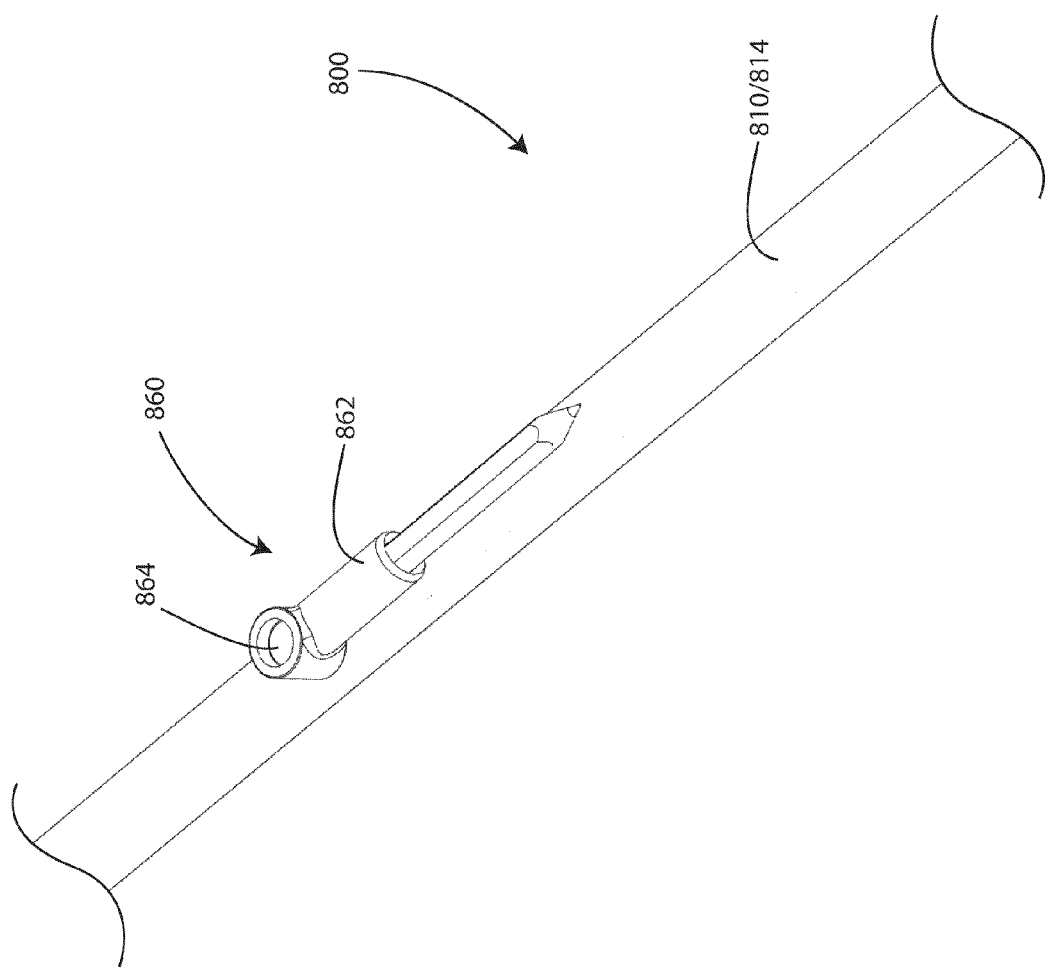

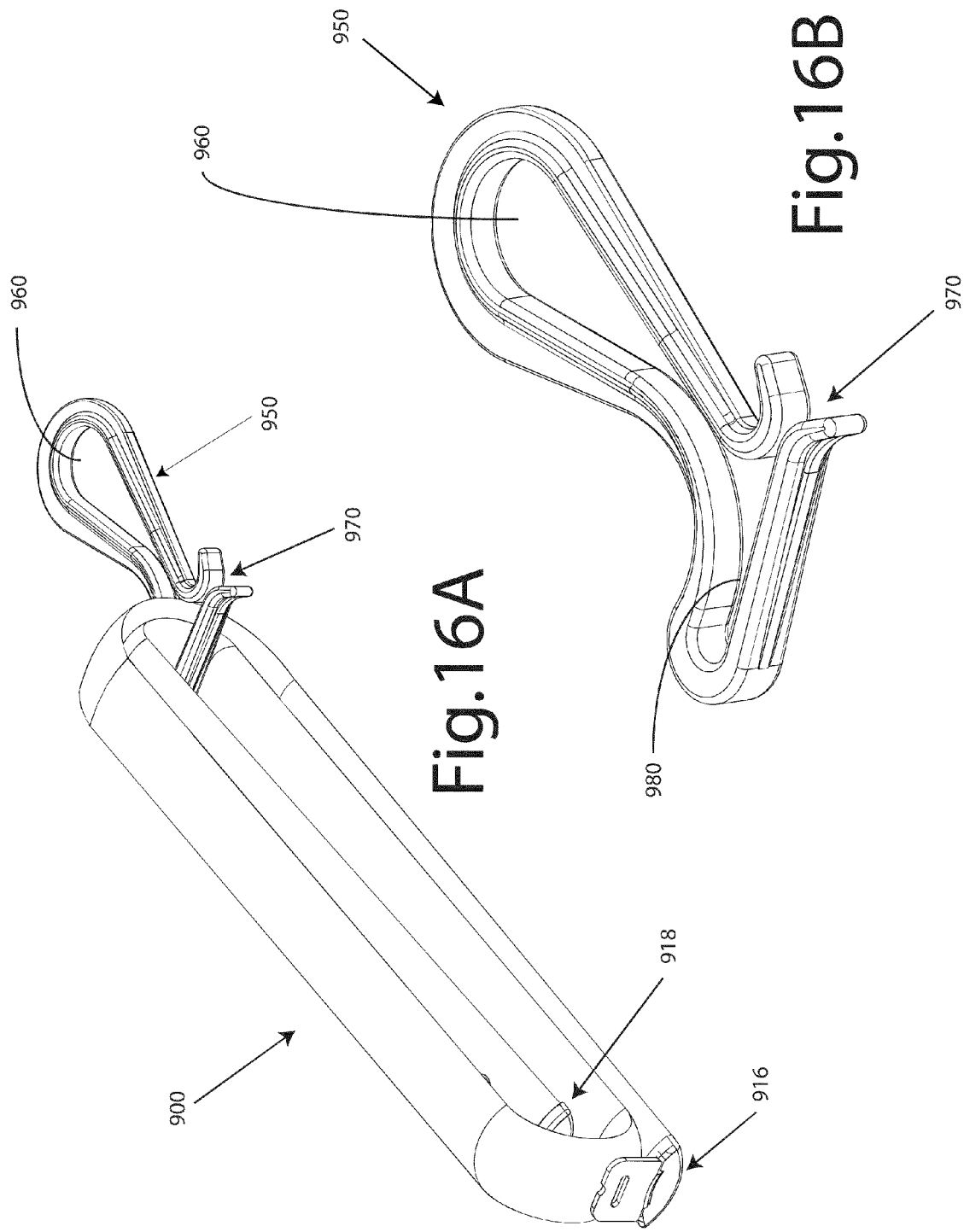

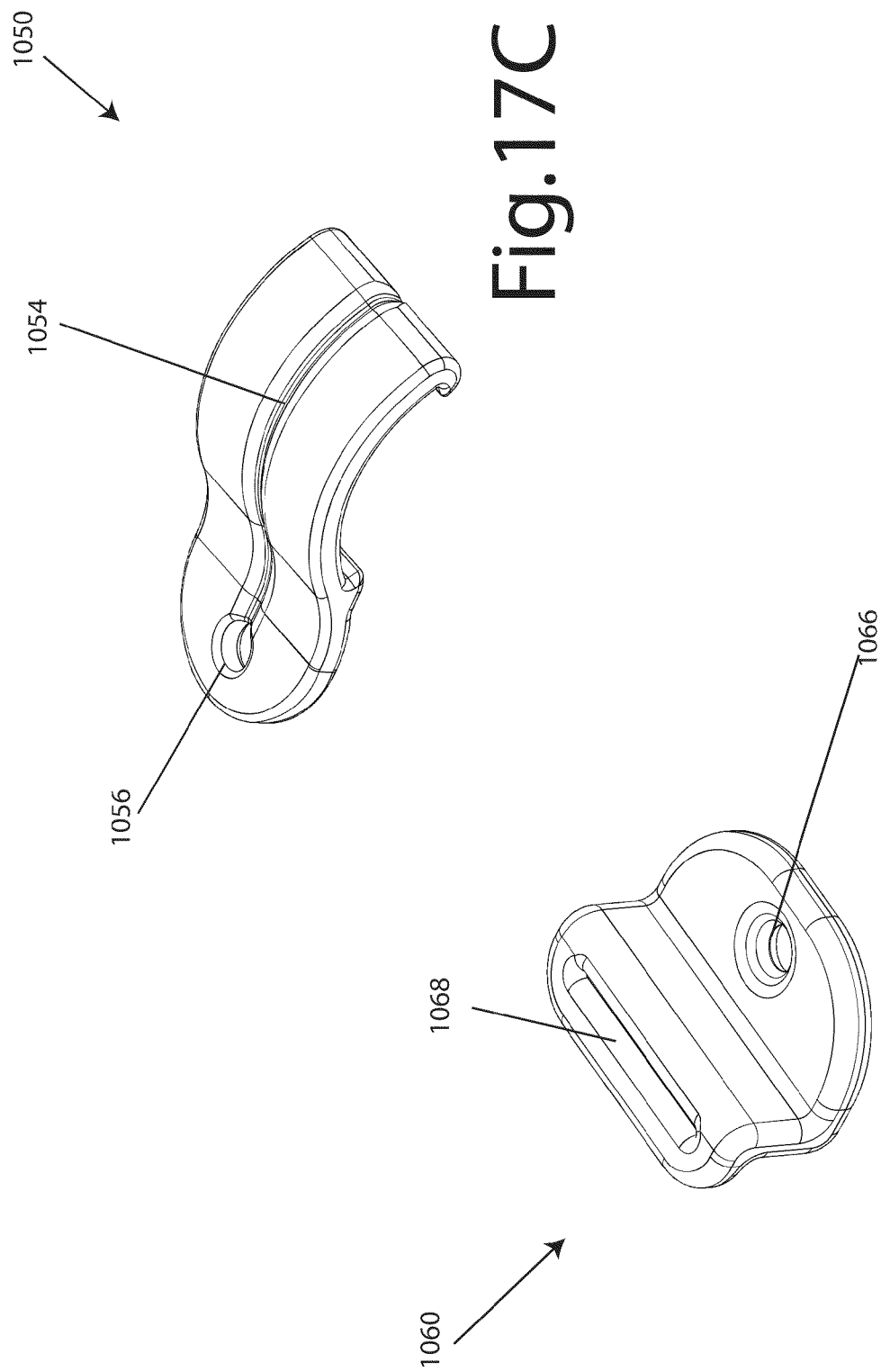

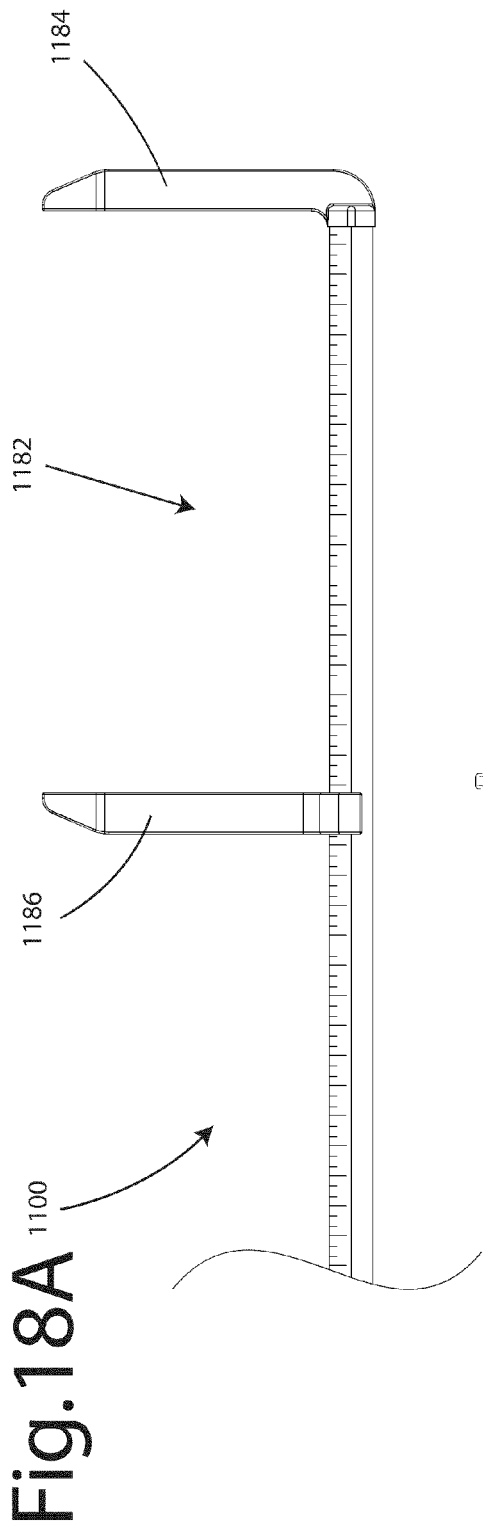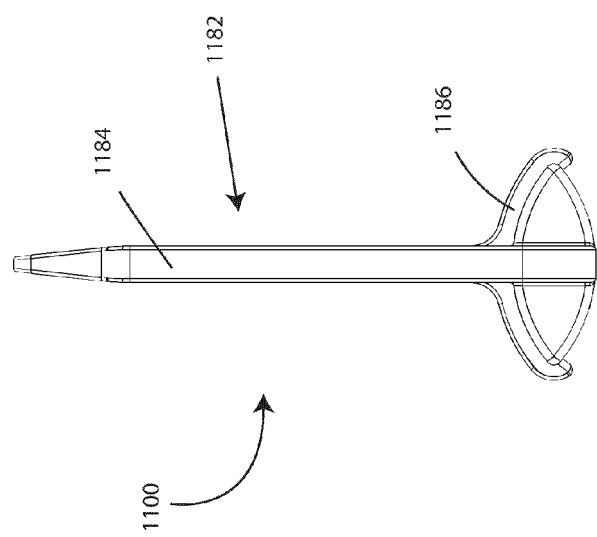
Fig.18A
Fig.18B

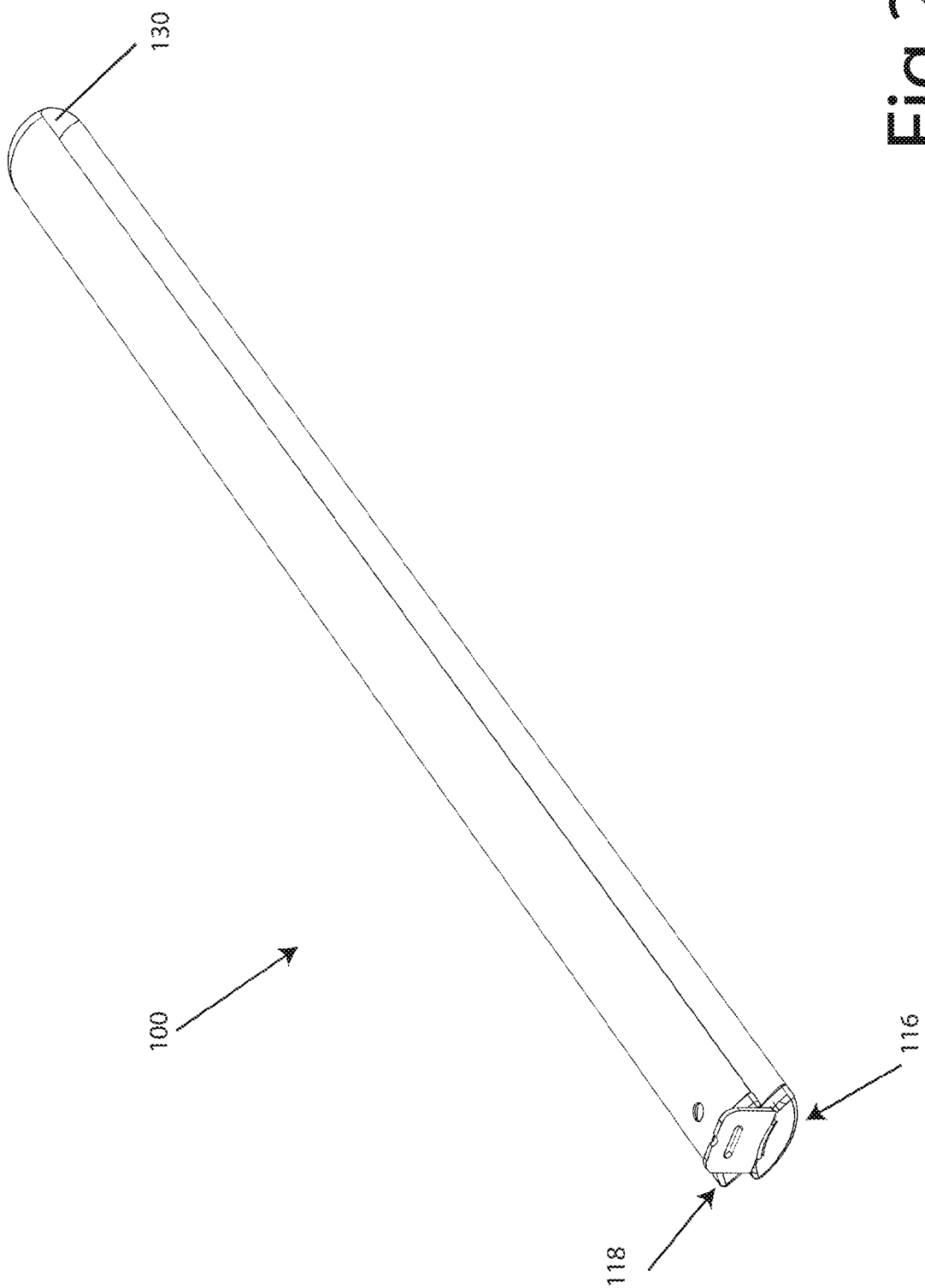

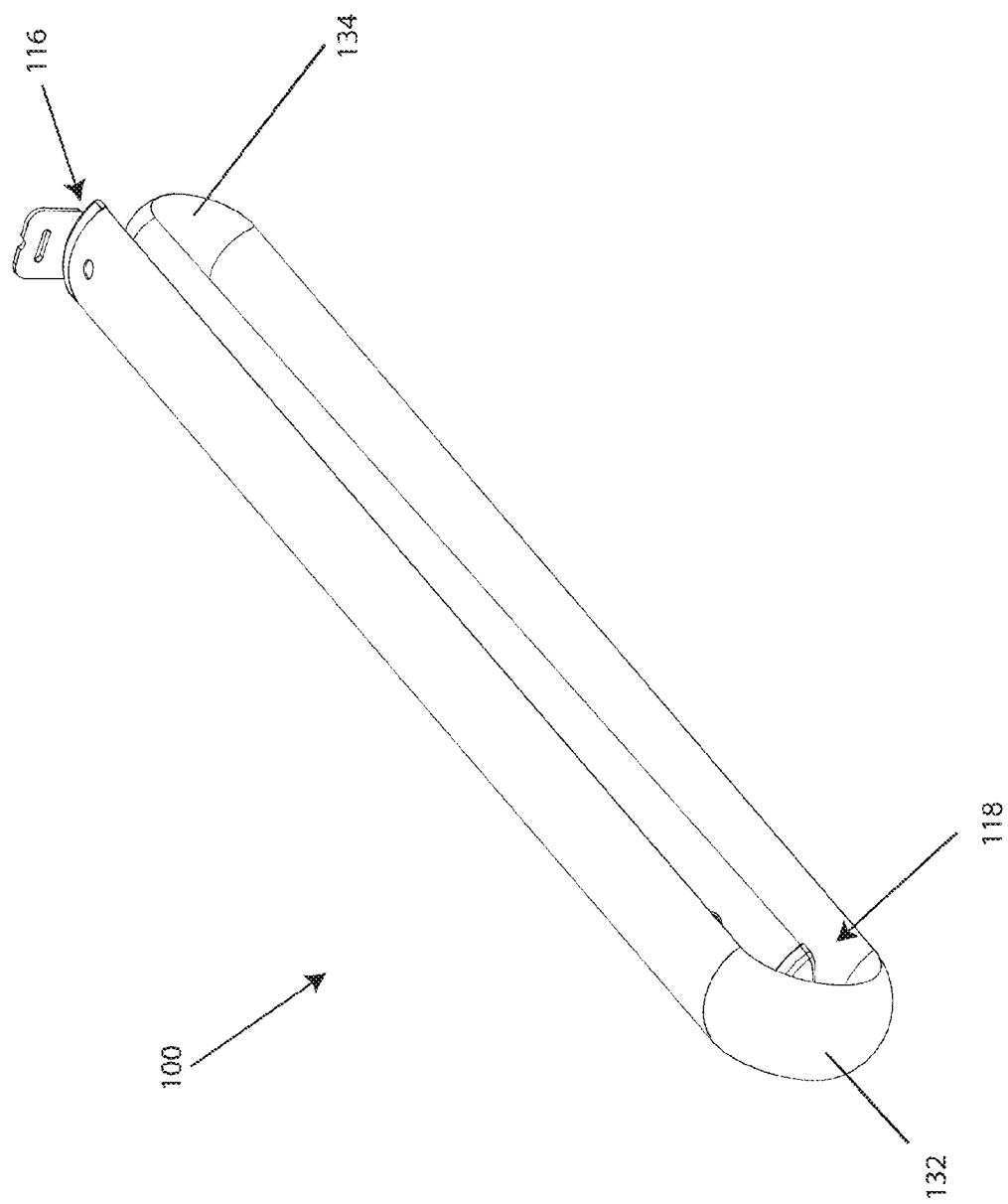

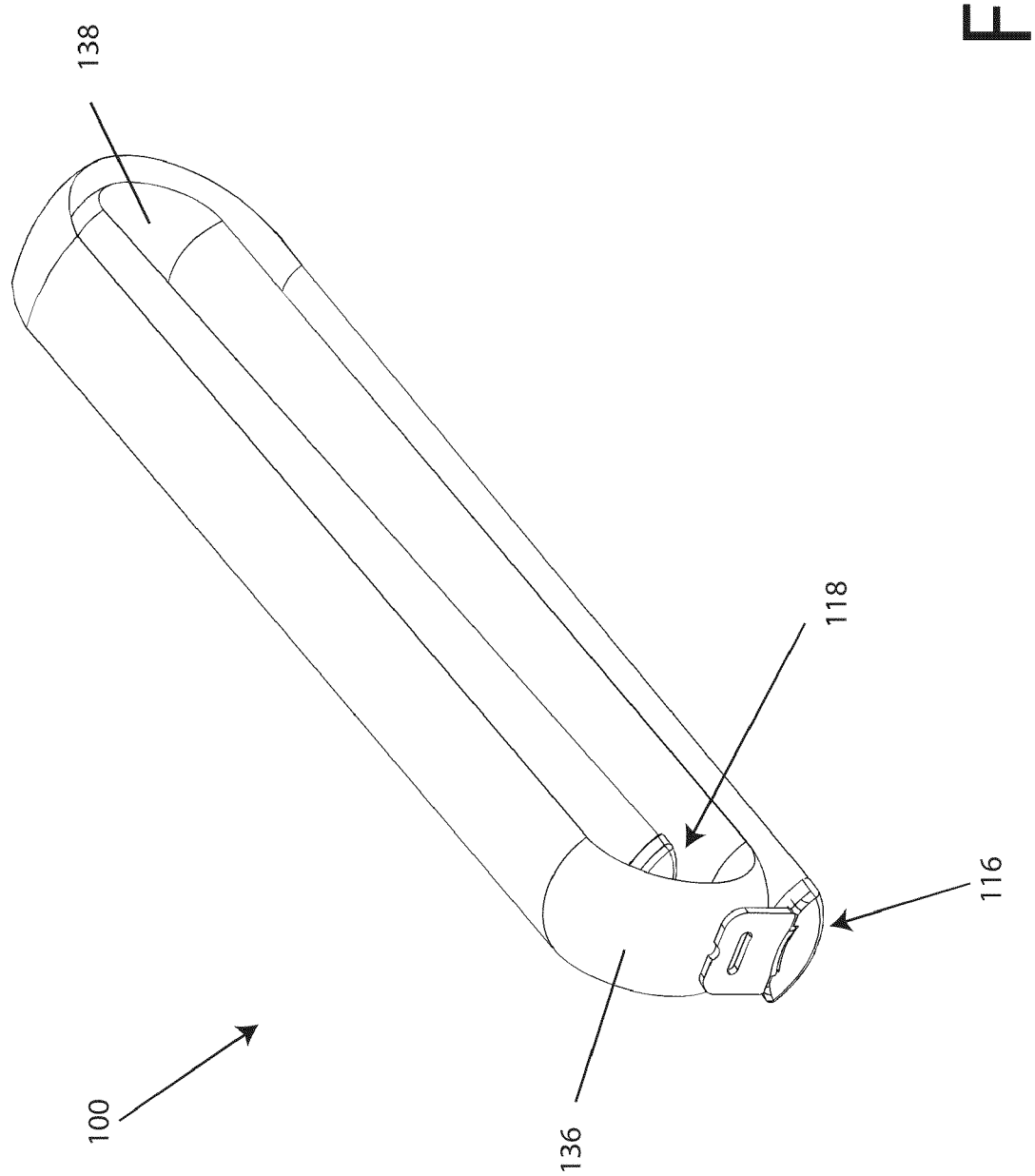

SELF-EXTENDING ELONGATE MEMBER AND USE THEREOF

CROSS REFERENCE TO RELATED APPLICATION

This case claims priority to, and any other benefit of, U.S. Provisional Patent Application Ser. No. 61/084,399, filed on Jul. 29, 2008 and entitled SELF-EXTENDING ELONGATE MEMBER AND USE THEREOF, which is hereby incorporated by reference in its entirety.

FIELD OF THE INVENTION

The invention of the present application relates to a self-extending elongate member and uses thereof. More specifically, one exemplary embodiment of the invention described in the present application relates to a self-extending measuring device—such as a yardstick or meter stick—that may be repeatedly folded along itself for storage and that automatically unfolds into an extended configuration for use.

BACKGROUND

Conventional measuring devices are commercially provided in one of three configurations, an elongate and rigid configuration (e.g., a yardstick or ruler), an expandable and flexible configuration (e.g., a tape measurer), and a foldable configuration (e.g., a foldable yardstick). As known, rigid yardsticks, which are often constructed of wood, are generally about three feet long and provide a device for use in, e.g., measuring, construction, drawing, and the like. The elongate nature of such rigid yardsticks disposes the same to frequent complications, such as easy, inadvertent fracture, frustrated portability, difficult storage, and the like. Further, tape measurers are flexible and generally collapse, or bend, when the measuring portion is expanded beyond a certain length.

As also known, foldable yardsticks are often provided as a plurality of relatively short and rigid members mutually inter-associated through distal pivot points that permit the short member to alternately be extended into an elongate configuration and be folded into a compacted configuration. The pivoting configuration also entails complications. For example, the pivot points are often given to use-based failure and breakage. By way of additional example, the pivot points also typically require maintenance, such as oiling, to ensure proper functioning of the yardstick, a fact necessitating wasteful expenditure of effort. According to yet another example, extending and folding conventional foldable yardsticks requires a significant amount of time and effort.

SUMMARY

A measuring device is provided that may be selectively configured between an extended condition and a collapsed condition. An exemplary embodiment comprises a first and a second elongated member, each member having a proximal end, a distal end, and a convex surface, wherein the convex surface of each member is flexible such that the members may bend about at least one bending axis of the measuring device and resilient such that the convex surfaces are biased toward their stable convex shape and the measuring device is biased toward the extended condition; a flexible housing, wherein the first and the second members are disposed within the flexible housing forming a covered pair having a proximal end and a distal end, wherein the apex of the convex surface of the first member is opposite the apex of the convex surface of the second member when the members are disposed within the flexible housing; and a securing means for securing the measuring device in the collapsed condition.

BRIEF DESCRIPTION OF THE DRAWINGS

These and other features and a more thorough understanding of the invention may be achieved by referring to the following description, taken in conjunction with the accompanying drawings, wherein:

FIG. 1 is a perspective view of an exemplary measuring device according to an embodiment of the invention;

FIG. 2 is an end view of the measuring device of FIG. 1;

FIG. 3 is an exploded perspective view of the components of the measuring device of FIG. 1;

FIG. 4 is a side view of the measuring device of FIG. 1, wherein the measuring device is secured in an exemplary collapsed position by magnets;

FIGS. 5A-5C are various perspective views showing a first exemplary end member of the measuring device of FIG. 1, wherein the first end member is an endcap having a flange;

FIG. 6 is a perspective view of a second exemplary end member of the measuring device of FIG. 1, wherein the second end member is an endcap;

FIG. 7A is a perspective view of an exemplary measuring device according to an embodiment of the invention, wherein the measuring device comprises an exemplary end member having a band and a hook;

FIG. 9 is a perspective view of an exemplary measuring device according to an embodiment of the invention, wherein the measuring device comprises an exemplary T-square head;

FIGS. 11A-11D are various views of an exemplary measurement marker configured to attach to a measuring device with magnets;

FIGS. 12A-12D are various views of an exemplary measurement marker configured to snap onto a measuring device;

FIGS. 13A-13C are various views of an exemplary leveling device configured to attach to a measuring device with magnets;

FIGS. 14A-14E are various views of an exemplary leveling device configured to snap onto a measuring device;

FIGS. 15A-15C are various views of an exemplary pencil holder configured to attach to a measuring device with magnets;

FIGS. 16A-16B are various views of an exemplary clip configured to hook onto a measuring device;

FIGS. 17A-17D are various views of an exemplary site guide and pivot axle attachment for a measuring device;

FIGS. 18A-18B are various views of an exemplary caliper device for a measuring device;

FIGS. 20A-20C are various views of the measuring device of FIG. 1, wherein the measuring device is shown in exemplary collapsed configurations.

DETAILED DISCUSSION

Figure 5B:
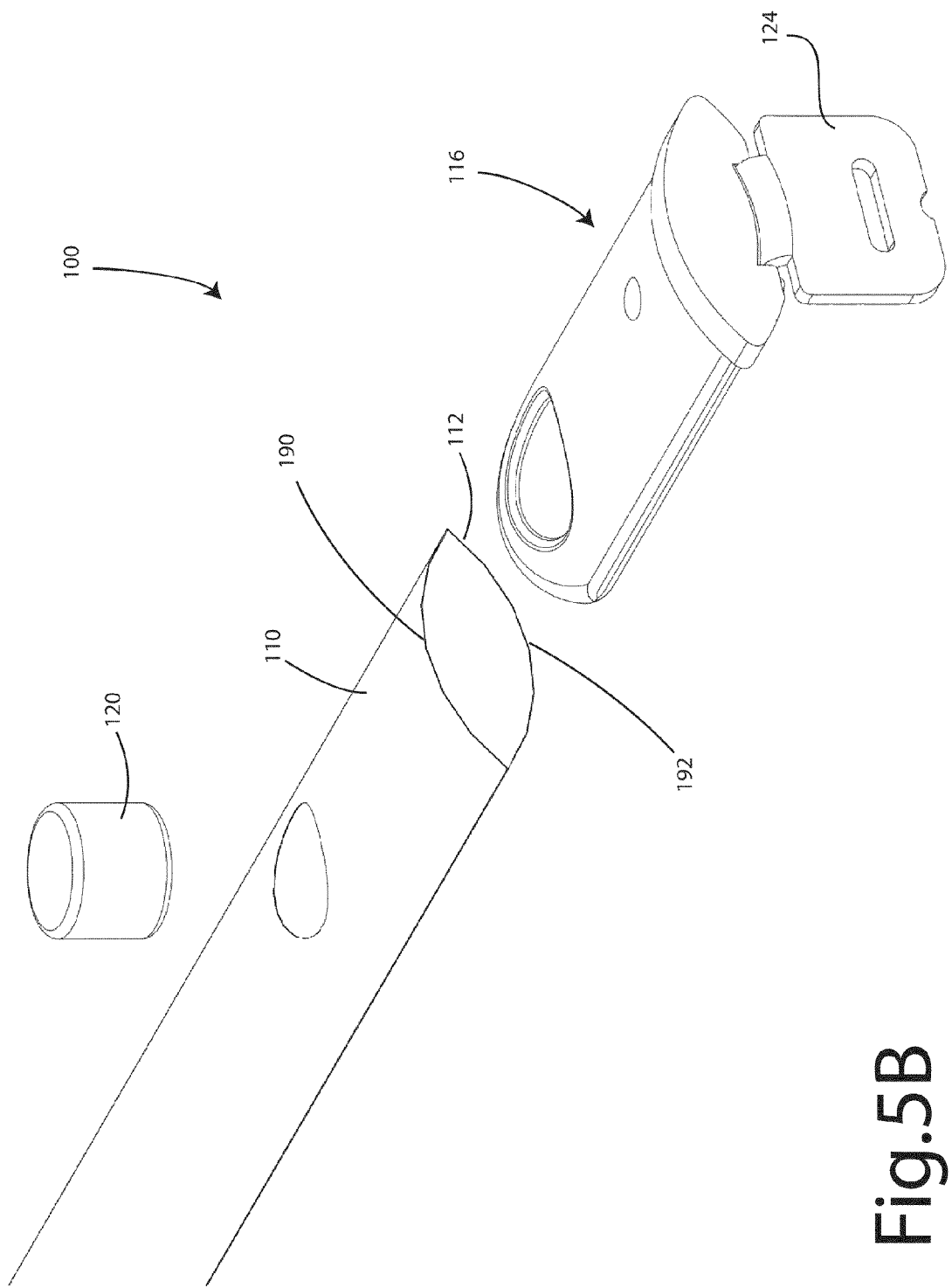
Figure 5C:
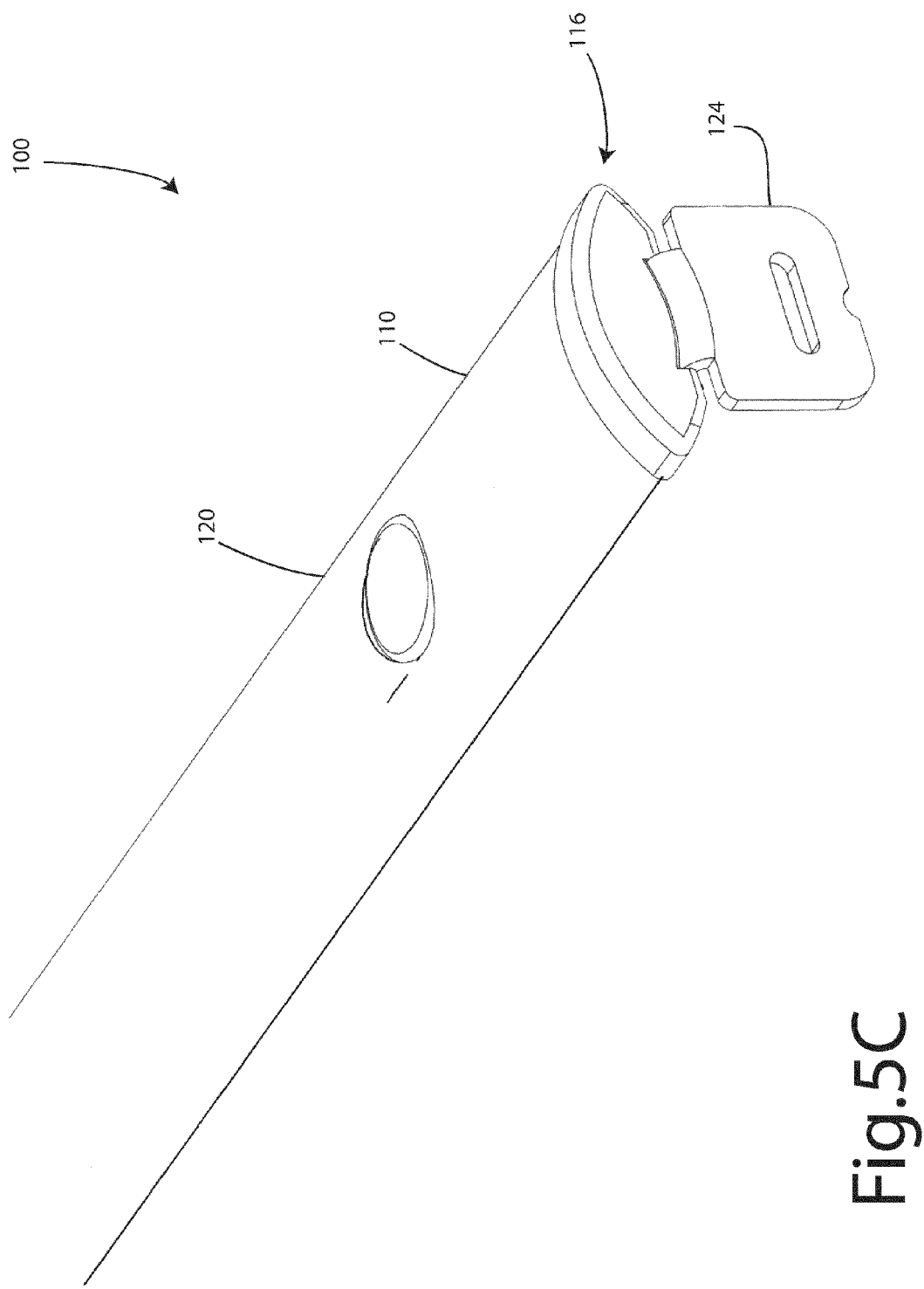

Disclosed herein are exemplary self-extending elongate members and various uses thereof. The self-extending member is generally constructed of a material that enables the member to alternately and repeatedly adopt an elongate configuration, for use as desired, and a compacted configuration, for storage in a reduced size profile. Additionally, the material employed for construction of the member suitably displays self-extending properties, i.e., unless acted upon by an outside force, the member's materials bias the member into an extended and generally elongate configuration.

The ability of the elongate member to self extend and to repeatedly adopt a compacted configuration positions the member for numerous applications. In one example, the self-extending member is configurable as a measuring device, such as a ruler, a yardstick, a meter stick, a t-square, a caliper, or the like. Although the embodiments of the invention discussed in the present application describe the self-extending member as a measuring device, it is to be appreciated that the invention is not to be construed as so limited. Specifically, the present disclosure is directed to any device that would, either solely or combination, benefit from incorporation of the self-extending member.

For example, the self-extending member may be configured as a pole-like extension or handle for another device. Thus, the self-extending member may be used as an extension-like pole for a duster, an elevated light bulb changer, a pointing or otherwise indicating device, and the like. Further to the extension embodiment, the self-extending member may suitably be configured as a golf green sweep. More specifically, an end of the self-extending member may suitably be fitted with and/or generally terminate in a means (e.g., a brush, a flexible panel, and the like) adapted for displacing debris from a golf green for generally clearing an unobstructed putting path. The self-extending member may be used as a collapsible pole for numerous different tools and implements, e.g., a golf ball retriever, a window washer, a tree trimmer, etc. with a device at one end of the self-extending member (e.g., a net, a scoop, a duster, a light bulb gripper, a writing instrument, a squeegee, a mop, a branch cutter, a saw blade, etc.) and perhaps an optional handle at the other end of the self-extending member.

By way of yet another example, the self-extending member may be configured for use in surveying, e.g., as range poles, miscellaneous surveying tools and the like. By way of additional example, the self-extending member may be configured as a level, variously additionally incorporating a leveling bubble or other elements as appropriate. In another example, the self-extending member may be configured as a collapsible, yet load-bearing support, such as a leg of a table or other support surface, with one end of the self-extending member coupled to the table top or other support surface and the other configured to extend therefrom to provide support. In yet another example, the self-extending member may be configured as a collapsible barrier, such as a fence or part thereof, an animal exercise pen, a child and/or animal gate, and the like. Such structures may comprise a plurality of the self-extending members coupled together with each other, and perhaps also coupled to various non-extending members, to form the barrier, fence, pen, gate, etc. in such a manner that a plurality of the self-extending members collapse, permitting the barrier, fence, pen, gate, etc. to collapse. Thus, it is to be appreciated that the present disclosure is directed to the self-extending elongate member and any suitable application, including advertising, thereof.

The self-extending member of the present application may also comprise magnetic material or include magnets. For example, the self-extending member may be configured as a pole-like extension or handle having magnets disposed at one or both ends. The magnets would allow the user to extend the unit and pick up objects, such as for example, screws or tools, in hard to reach places, such as for example, the bilge of a boat or within an engine compartment of a car.

Exemplary embodiments in the present application generally comprise a self-extending member configurable as a measuring device. The measuring device may be selectively configured between an extended condition and a collapsed condition. The measuring device generally comprises a first elongated member, a second elongated member, an optional flexible housing, and an optional securing means for securing the measuring device in the collapsed condition. Each elongated member may have a proximal end, a distal end, and a convex surface. The convex surface of each elongated member may be flexible such that the member may bend about at least one bending axis of the measuring device. Further, the convex surface of each elongated member may be resilient such that the convex surface is biased toward its stable convex shape and the measuring device is biased toward the extended condition. The first and second elongated members are generally disposed within the flexible housing. Within the flexible housing, the elongated members may form a covered pair having a proximal end and a distal end. Further, the apex of the convex surface of the first elongated member may be opposite the apex of the convex surface of the second elongated member when the members are disposed within the flexible housing.

The measuring device of the present application suitably overcomes many limitations of conventional measuring devices. For example, the simplicity with which the measuring device alternates between an extended and compacted configuration suitably reduces operational time, i.e., the measuring device automatically extends quickly and is manipulable to adopt a compacted configuration quickly. By way of additional example, the ability of the measuring device to assume a compacted configuration facilitates storage and transport of the same. According to yet another example, the preferred materials used for construction of the measuring device are suitably highly resistant to breakage and use-based fracture, thereby configuring the measuring device for durable, long use. Further, the measuring device is substantially rigid in the extended, or elongate, configuration prohibiting the measuring device from bending, or collapsing, like a conventional measuring devices. Other advantages will be readily apparent from the discussion provided herein.

Referring now to the Figures, FIGS. 1-4 illustrate an exemplary self-extending elongated member configured as a measuring device 100 according to an embodiment of the invention. As shown, the measuring device 100 comprises a first elongated member 110, a second elongated member 112, a flexible housing 114, two magnets 120, 122, and two end members 116, 118. Each elongated member comprises a proximal end, a distal end, and a convex surface. Each elongated member further comprises a first longitudinal edge and a second longitudinal edge. The first longitudinal edge of the first elongated member 110 abuts the first longitudinal edge of the second elongated member 112. Similarly, the second longitudinal edge of the first elongated member 110 abuts the second longitudinal edge of the second elongated member 112. As shown in FIG. 2, the apex 190 of the convex surface of the first elongated member 110 is opposite the apex 192 (see FIG. 3) of the convex surface of the second elongated member 112 defining a generally elliptical or oval cross section of the measuring device 100.

The convex surface of each elongated member is flexible such that the measuring device may bend about a bending axis 101 at various locations along the length of the measuring device 100. Further, the convex surface of each elongated member is resilient such that the convex surface is biased toward its stable convex shape and the measuring device 100 is biased toward the extended condition shown in FIG. 1. However, the convex surfaces of the elongated members prohibit or resist bending or flexing of the measuring device about the vertical axis 102 shown in FIG. 2.

As the elongated members bend about the bending axis of the measuring device 100, the longitudinal edges of first elongated member 110 and the longitudinal edges of second elongated member 112 move laterally. More specifically, the first longitudinal edge of the first elongated member 110 and the first longitudinal edge of the second elongated member 112 move in the opposite lateral direction than the second longitudinal edge of the first elongated member and the second longitudinal edge of the second elongated member as the members bend about the bending axis 101 of the measuring device 100. Further, the longitudinal edges of first elongated member 110 move independently of the longitudinal edges of second elongated member 112 as the members bend about the bending axis 101 of the measuring device 100.

As shown in FIGS. 1-4, the elongated members comprise arcuate lengths of spring steel, e.g., 50C spring steel about 7 mils in thickness. The spring steel is one example of a material displaying the characteristics of self-extension and repeated compacting and extending. Such spring steel, especially in an arcuate in cross sectional configuration, is typically a constituent element of conventional tape measuring devices, wherein an elongate single layer length of spring steel is provided in a form that is adapted for coiling along itself and being extended therefrom for measuring, as known. However, contrary to conventional tape measuring devices, the measuring device of the present application features two layers of spring steel lengths, one atop the other, with the apexes 190, 192 of each of which being disposed spaced apart from each other, thereby configuring the measuring device with its overall arcuate and generally elliptical configuration. The configuration of two layers of spring steel lengths curved outward from each other suitably provides the above-discussed properties of flexibility about the bending axis 101, while significant strength and resilience to bending about the vertical axis 102.

As evident from FIGS. 1-4, the elongated members are configured as generally elongate elements having an overall rectangular configuration perceivable from a top plan view. Additionally, the elongate members feature an arcuate curve that extends generally perpendicularly relative to a longitudinal axis of the elongated members and along the entire length thereof. As such, each elongated member is generally akin to a section of an elliptical cylinder taken along a bisecting longitudinal axis thereof.

The elongated members may be provided in any length suitable for the particular desired application of the measuring device 100. For example, the elongated members may suitably be fashioned in twelve inch lengths, half-meter lengths, two foot lengths, three foot lengths, meter lengths, six foot lengths, and the like. Any appropriate size is contemplated. There may be benefits to having very long measuring devices in this configuration, e.g., 12 feet, 16 feet, 20 feet, etc. Further, the elongated members may suitably be modified as appropriate given the application of the measuring device 100. For example, the elongated members may be galvanized or otherwise coated so as to prevent rusting, tarnishing and the like.

Despite discussion of lengths of spring steel as a constituting the elongated members, it is to be appreciated that any material displaying the hereinabove-described properties may be employed for the measuring device 100. For example, a suitably flexible and resilient plastic, such as a PET or similar bendable and engineered polymer may be employed. In particular, a plastic may be especially advantageous, as each elongated member may suitably be produced by extrusion as a single element having the overall arcuate configuration.

The device may additionally include a flexible housing for housing the elongated members therein. As shown in FIGS. 1-4, the measuring device 100 is generally defined by the elongated members, each of which are suitable spring steel components. As shown, the first 110 and second 112 elongated members are disposed within a flexible housing 114. Within the flexible housing 114, the elongated members form a covered pair having a proximal end and a distal end. Further, the apex 190 of the convex surface of the first elongated member 110 is opposite the apex 192 of the convex surface of the second elongated member 112 when the members are disposed within the flexible housing 114. Accordingly, the flexible housing 114 suitably provides a sleeve-like housing in which the elongated members are disposed for application and use as desired.

The flexible housing 114 operates to securely maintain the elongated members therein and is constructed of a material that provides a high level of durability and flexibility, such as a fabric, nylon, plastic, and the like. However, any means may be employed for housing the elongated members, such as a heat shrunk casing applied thereover, and the like. Additional features, such as for example, length indicia, printing, advertising, and the like, may be provided on the flexible housing 114. Further, the flexible housing 114 may be made of a transparent material, such as for example, any flexible clear plastic such as polypropylene or vinyl, such that length indicia and other additional features on the outer surface of the elongated members are visible. The flexible housing 114 may also be various suitable diameters, such as for example, ⅝", ¾", 1", etc., and thicknesses. An exemplary implementation of the present invention may be constructed from two lengths of spring steel removed from a conventional tape measure arranged in the configuration of FIGS. 1-4 inside a ¾" diameter tubular sleeve made of polypropylene.

Although the sleeve 114 securely maintains the elongated members inside the sleeve 114, in exemplary embodiments slight movement of one relative to the other is permitted to facilitate bending, i.e., at least a portion of the first elongated member 110 and at least a portion of the second elongated member 112 are free relative to each other within the flexible housing 114.

The measuring device may suitably include a securing means for securing the device in a compacted configuration. As previously mentioned, the measuring device 100 is suitably adapted to alternate between an extended state, as generally depicted in FIG. 1, and a compacted state, as shown in FIG. 4. As also previously mentioned, the measuring device 100 is a self-extending member, generally meaning that the device sua sponte tends toward an extended state, unless acted on by an outside force. The securing means provides such an outside force for securing the measuring device 100 in a compacted state, but yet which provides an easy mechanism for allowing the device to self-extend.

As shown in FIGS. 1-6, an exemplary securing means of the measuring device 100 is provided as one or more magnets 120, 122 disposed at one or both ends of the measuring device. In the exemplary embodiments shown, the magnets 110, 112 are integrally associated with an end member 116, 118 of the measuring device 100 in a position that provides ready access thereto. For example, as shown in FIG. 5B, the magnet 120 is inserted through holes, or apertures, in the elongated members and end member 116. The magnet 120 is sized such that the top and bottom of the magnet is flush with the surface of the elongated members. The magnet may be secured to the measuring device 100 by any suitable method known in the art, such as with an adhesive, press fit, and the like.

FIG. 4 shows the measuring device 100 in an exemplary collapsed configuration or condition. In the exemplary embodiment of FIGS. 1-4, the measuring device 100 is held in the collapsed configuration with the one or more magnets 120, 122. Of course other means are shown herein for retaining the device 100 in the collapsed configuration. The one or more magnets 120, 122 may attach to the spring steel of the elongated members or to each other when positioned in mutual proximity. As shown, the proximal and distal ends of the measuring device 100 are held together with the one or more magnets 120, 122 forming two bends 180, 182 (with relatively straight portions between the bends) so that the overall length of the device 100 in the collapsed configuration is about one-fourth the length of the device 100 in the extended configuration. The first bend 180 is formed as the ends are moved toward each other and connected via the magnets 120, 122. The second bend 182 in the measuring device 100 is formed as the first bend 180 is moved toward and connected to the coupled first/second ends and held to the end of the device with the one or more magnets 120, 122. The use of a magnetic material to form the elongate members and the use of magnets as a securing means permits the device to be very quickly secured in (and extended from) a number of different collapsed positions, such as when the collapsed device is ¼ or ⅓ or ½ the length of the extended device.

Despite the foregoing discussion of the magnets as a securing means, it is to be appreciated that any suitable securing means may be employed. For example, the securing means, if optionally present, may be removably associable or integrally associated with the measuring device. By way of additional example, the measuring device may suitably include various snap-locking and/or strap features. Any other suitable securing means may be employed. The securing means may include any one or any combination of any two or more of a magnet, a strap, a cord, a snap, a pin, a latch, an elastic member, a clip, hook and loop fasteners, etc. for securing the measuring device in the collapsed condition.

The measuring device may optionally also include one or more end members. The end members generally seal the ends of the measuring device and/or provide other functionality at the ends, as discussed below. For example, at least one end member may be fully or at least partially disposed within a void formed between a covered pair of elongate members, at one or both ends. The at least one end member may include any one or any combination of any two or more of a cap, a metal tab, a t-square, a hanging clip, or the like. As shown in the examples of FIGS. 1-6, the end members 116, 118, or endcaps, may be adapted to be slid into the flexible housing 114 and between the elongated members, with a terminal portion of the end members (e.g., a head-like portion) being disposed along ends of the measuring device 100. The exemplary end members 116, 118 shown generally function to seal the measuring device 100 and provide aesthetic appeal. Further, as shown, the end members 116, 118 also help to secure the magnets 120, 122. The end member 116 further comprises a flange 124, or metal tab, that acts as a true zero edge such that the end of the measuring device 100 may be aligned with an edge of whatever is being measured, such as for example a board, shelf, or the like.

As stated, within the flexible housing 114, the elongated members 110, 112 form a covered pair having a proximal end and a distal end. Further, in the exemplary embodiment shown, the apex 190 (see FIG. 2) of the convex surface of the first elongated member 110 is opposite the apex 192 of the convex surface of the second elongated member 112 when the members are disposed within the flexible housing 114. As shown in FIG. 4, the measuring device 100 is secured in the collapsed condition such that the covered pair has at least two bends 180, 182 (with relatively straight portions between the bends) with the proximal end and the distal end of the covered pair secured and a first bend 180 secured to one of the proximal end or the distal end of the covered pair so that the collapsed device is about a quarter the length of the extended device. In some embodiments, the measuring device can be bent into a number of different configurations. For example, in FIG. 20A, the device 100 is shown secured in the collapsed condition such that the covered pair has at least one bend 130 (with relatively straight portions between the bend and the rest of the device) with the proximal end and the distal end of the covered pair secured so that the collapsed device is about half the length of the extended device. In the alternative, in FIG. 20B, the device 100 is shown secured in the collapsed condition such that the covered pair has at least two bends 132, 134 (with relatively straight portions between the bends) with the proximal end of the covered pair secured to a first bend 134 and the distal end of the covered pair secured to a second bend 132 so that the collapsed device is about a third the length of the extended device. In the alternative, in FIG. 20C, the device 100 is shown secured in the collapsed condition such that the covered pair has and at least two bends 136, 138 (with relatively straight portions between the bends) with the proximal end and the distal end of the covered pair secured to one of the elongated members. These and other collapsed configurations are envisioned in the practice of the invention.

FIGS. 7A-7D illustrate an exemplary self-extending elongated member configured as a measuring device 200 according to another embodiment of the invention. As shown, the measuring device 200 comprises a first elongated member 210, a second elongated member 212, a flexible housing 214, and two end members 216, 230. The measuring device 200 further comprises a securing means provided as a band 234, such as for example an elastic latex band, disposed at an end of the device. More specifically, the band 234 is integrally associated with an end member 230 in a position that provides ready access thereto and manipulation thereof.

Figure 7B:
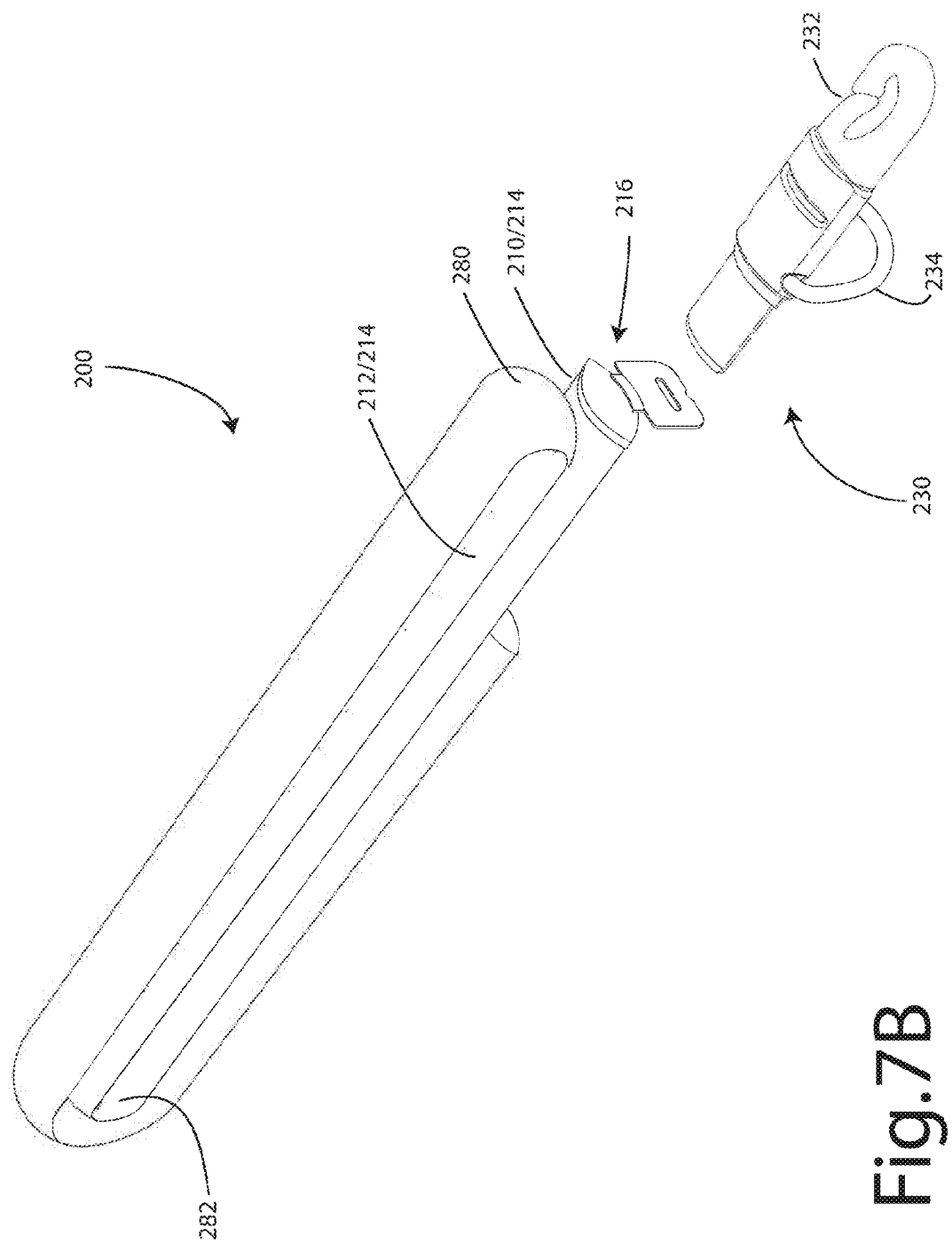
FIG. 7B is a perspective view of the measuring device of FIG. 7A, wherein the measuring device is in an exemplary collapsed position and the end member is partially removed from the measuring device.
Figure 7C:
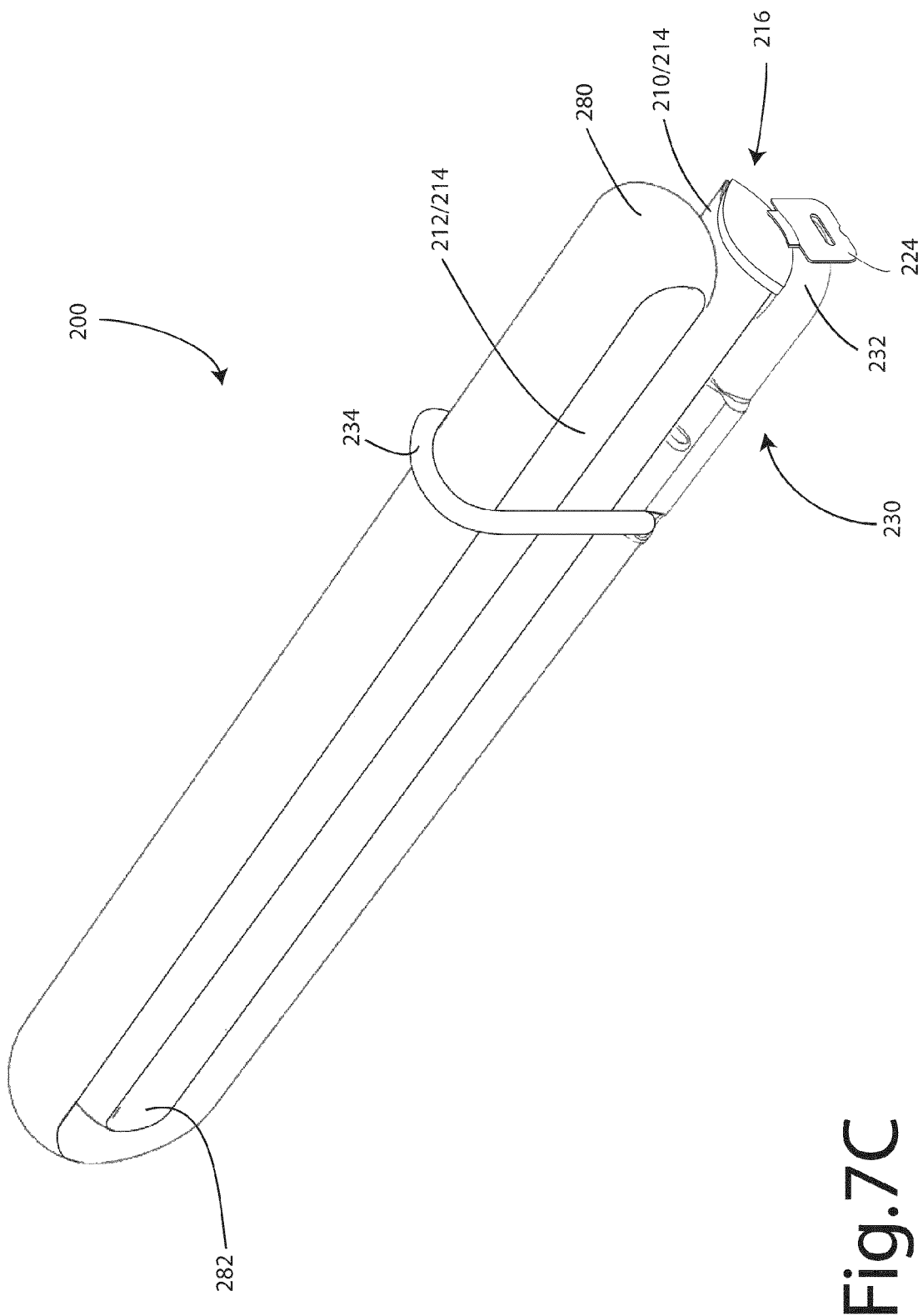
FIG. 7C is a perspective view of the measuring device of FIG. 7A, wherein the measuring device is secured in an exemplary collapsed position by the band of the end member.
Figure 7D:
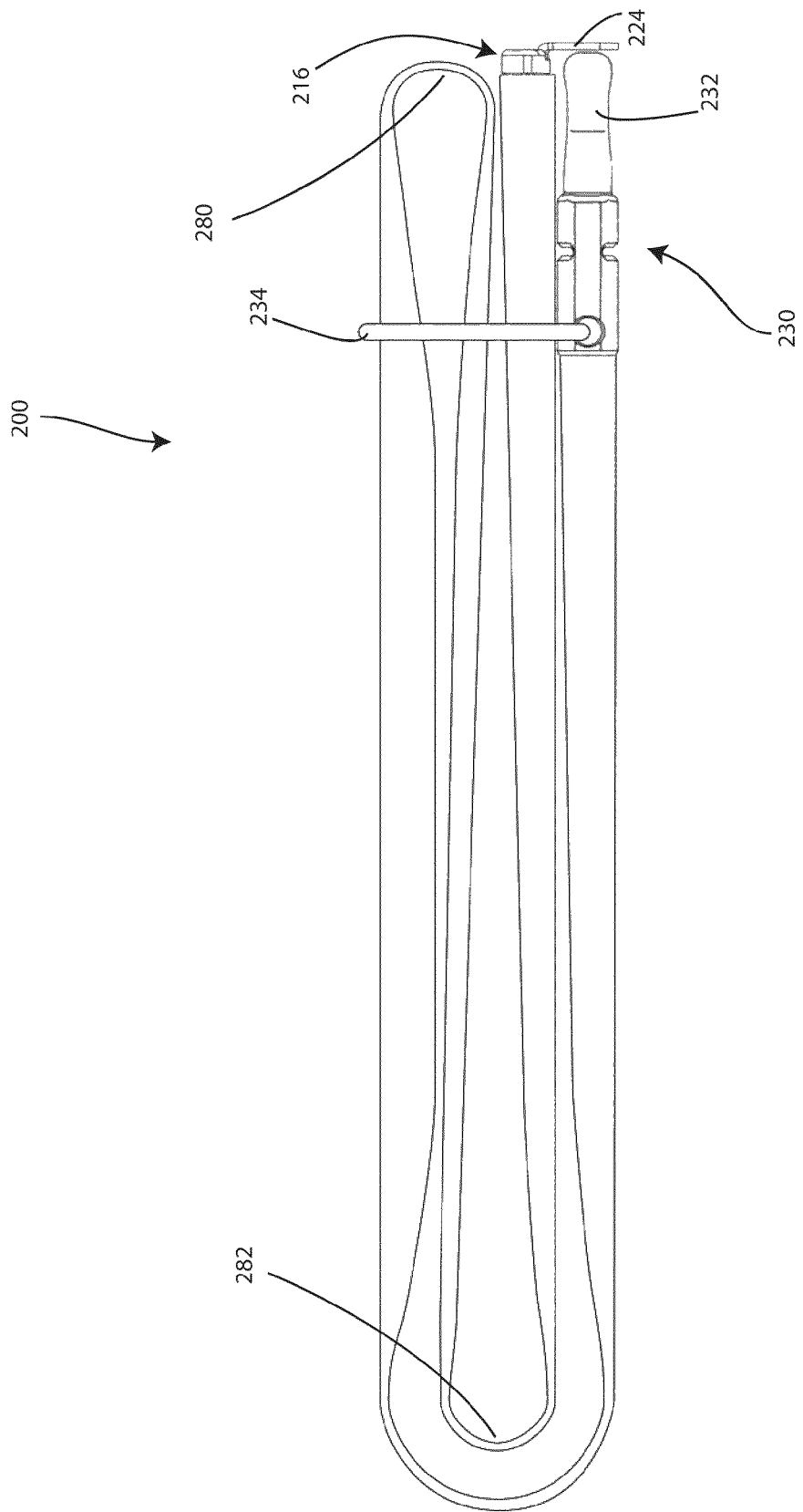
FIG. 7D is a side view of the measuring device of FIG. 7A, wherein the measuring device is secured in an exemplary collapsed position by the band of the end member.

As shown in FIGS. 7C and 7D, the measuring device 200 is repeatedly folded about itself, with the band 234 being drawn about the folded measuring device 200 to secure it in the folded state. As shown, the measuring device 200 is secured in the collapsed condition such that the covered pair has at least two bends 280, 282 (with relatively straight portions between the bends) with the proximal end of the covered pair, the distal end of the covered pair, and the first bend 280 secured by the band 234 so that the collapsed device is about a quarter the length of the extended device. It is to be appreciated that the measuring device 200 need not necessarily be folded. For example, if the properties of the measuring device suitably enable it to be coiled about itself, then the band can be disposed diametrically therearound (not shown).

Figure 8:
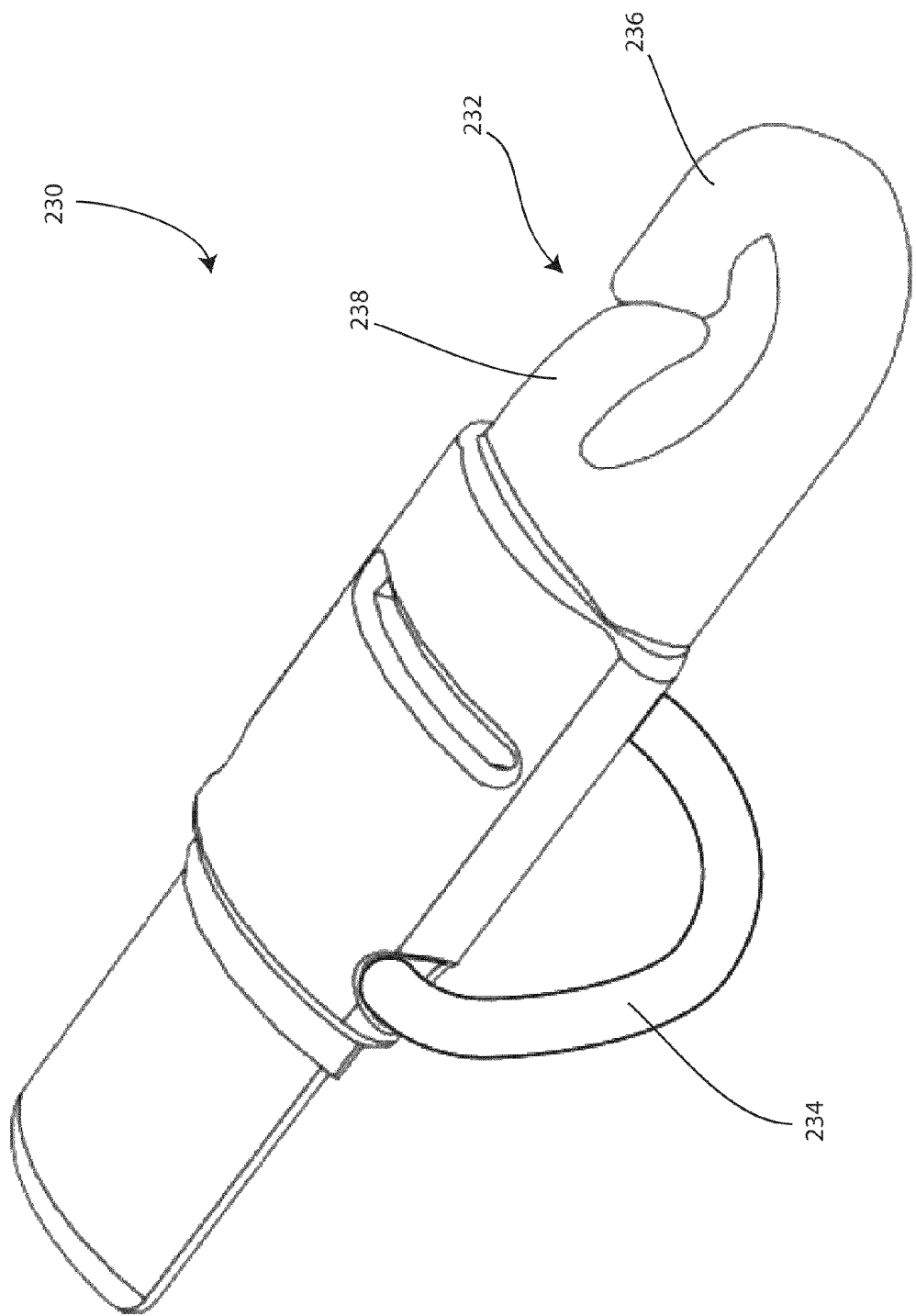
FIG. 8 is a perspective view of the end member of the measuring device of FIG. 7A, wherein the end member has a band and a hook.

As shown in FIGS. 7A-8, the end member 230 of the measuring device 200 further comprises a hook 232. The exemplary hook 232 further comprises a hook portion 236 and a latch portion 232. The latch portion 232 may be biased and apply a force against the hook portion 236. The biased latch portion 232 prevents the hook 232 from slipping off an anchor. The configuration of the latch portion 232 is one way to create the biasing effect. Exemplary latch portion 232 configurations include combinations of material, such as for example, a pliable plastic, and shape. However, it should be apparent that any biasing method or structure may be used to practice this invention, such as for example, a spring.

The hook 232 of the end member 230 may be used to secure the end of the measuring device 200 or to store the measuring device when not in use. However, other uses for the hook portion of the measuring device are envisioned, such as to hang the measuring device from a belt, a belt loop, a tool box, a tool belt, a ladder, or any application in which a hook may be used to hang the measuring device for easy access. Further, the hook 232 may be made from any suitable material known in the art, such as for example metal, rubber, or plastic.

Turning to FIG. 9, illustrated is another exemplary embodiment of the measuring device, wherein the device is configured as a T-square device 300, with optional measurement markings shown thereon. As shown, the T-square device 300 has an elongate, collapsible base having a T-square head 340 disposed at an end thereof and perpendicular thereto. The elongate, collapsible base may be configured as measuring devices 100, 200 discussed above, with elongate members 310, 312 (not shown) like elongate members 110, 112 and 210, 212 within a flexible sleeve 314 like flexible sleeves 114 and 214, as discussed above. As shown, the elongate, collapsible base is permitted to fold relative to the T-square head 340 and thereby reduce the size profile of the T-square device 300, as consistent with the aims of the measuring device of the present invention. Further, the pivotally attached head 340 allows the base to be used at various angles relative to the head.

Figure 10A:
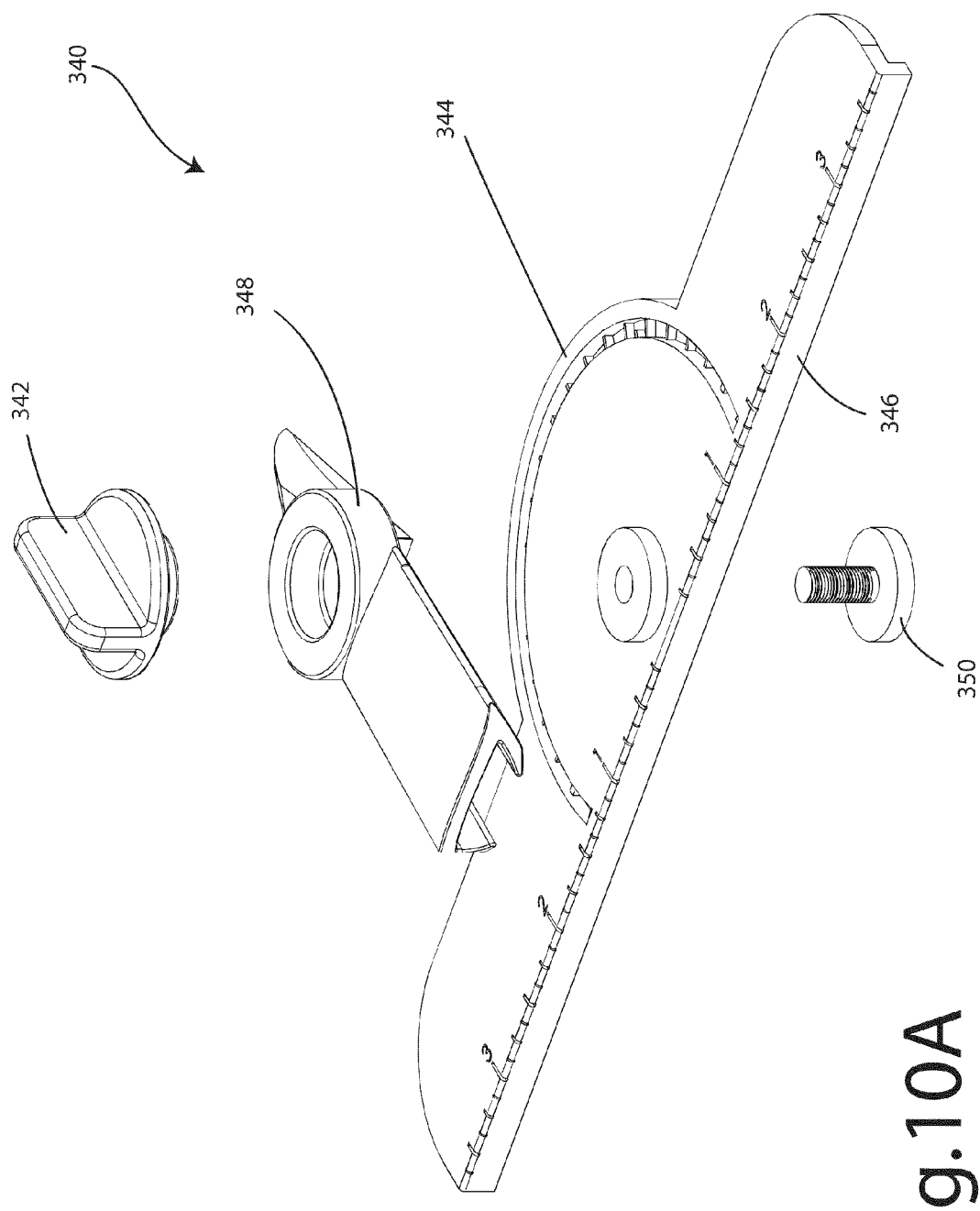
FIG. 10A is an exploded perspective view of the components of the T-square head of the measuring device of FIG. 9.
Figure 10B:
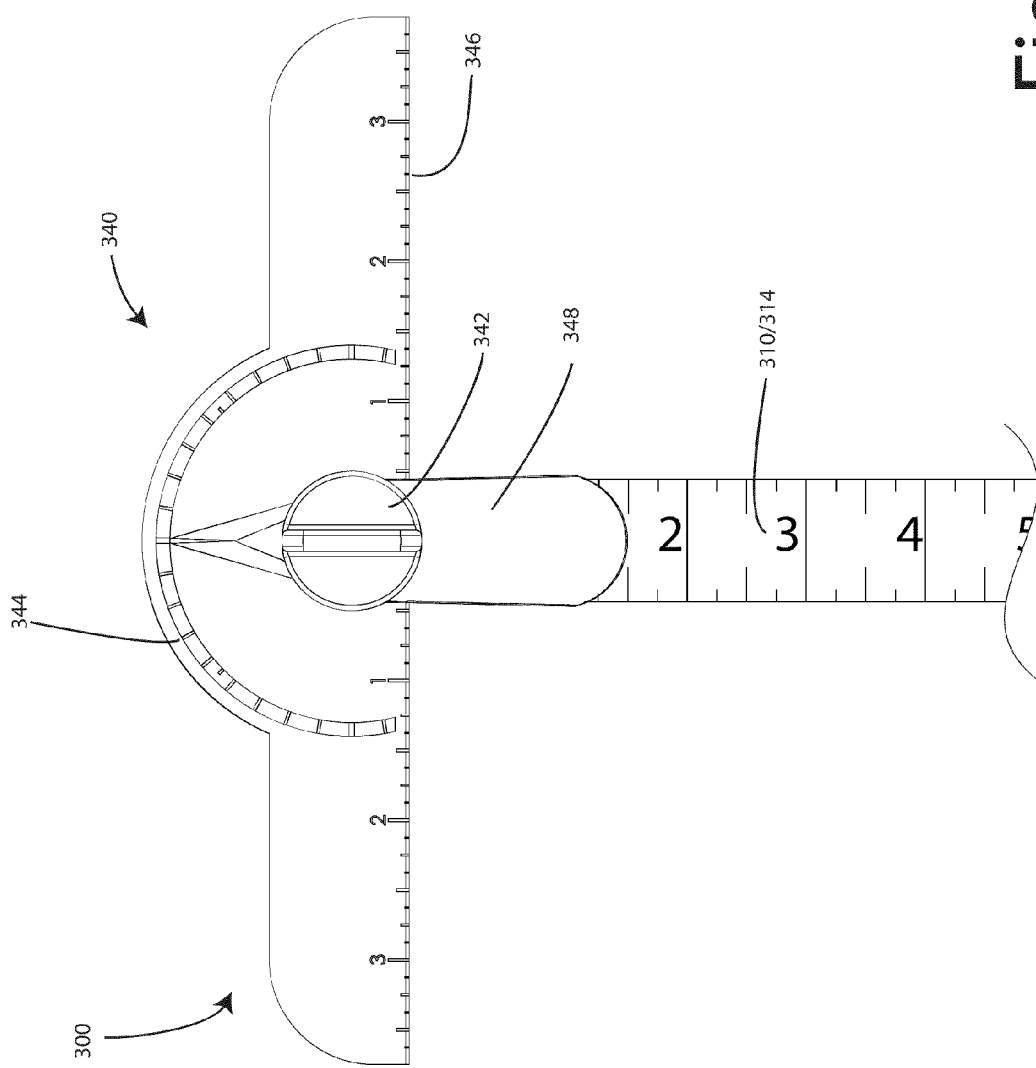
FIG. 10B is a partial top view of the measuring device of FIG. 9, wherein the measuring device is positioned at an angle of about 90 degrees.
Figure 10C:
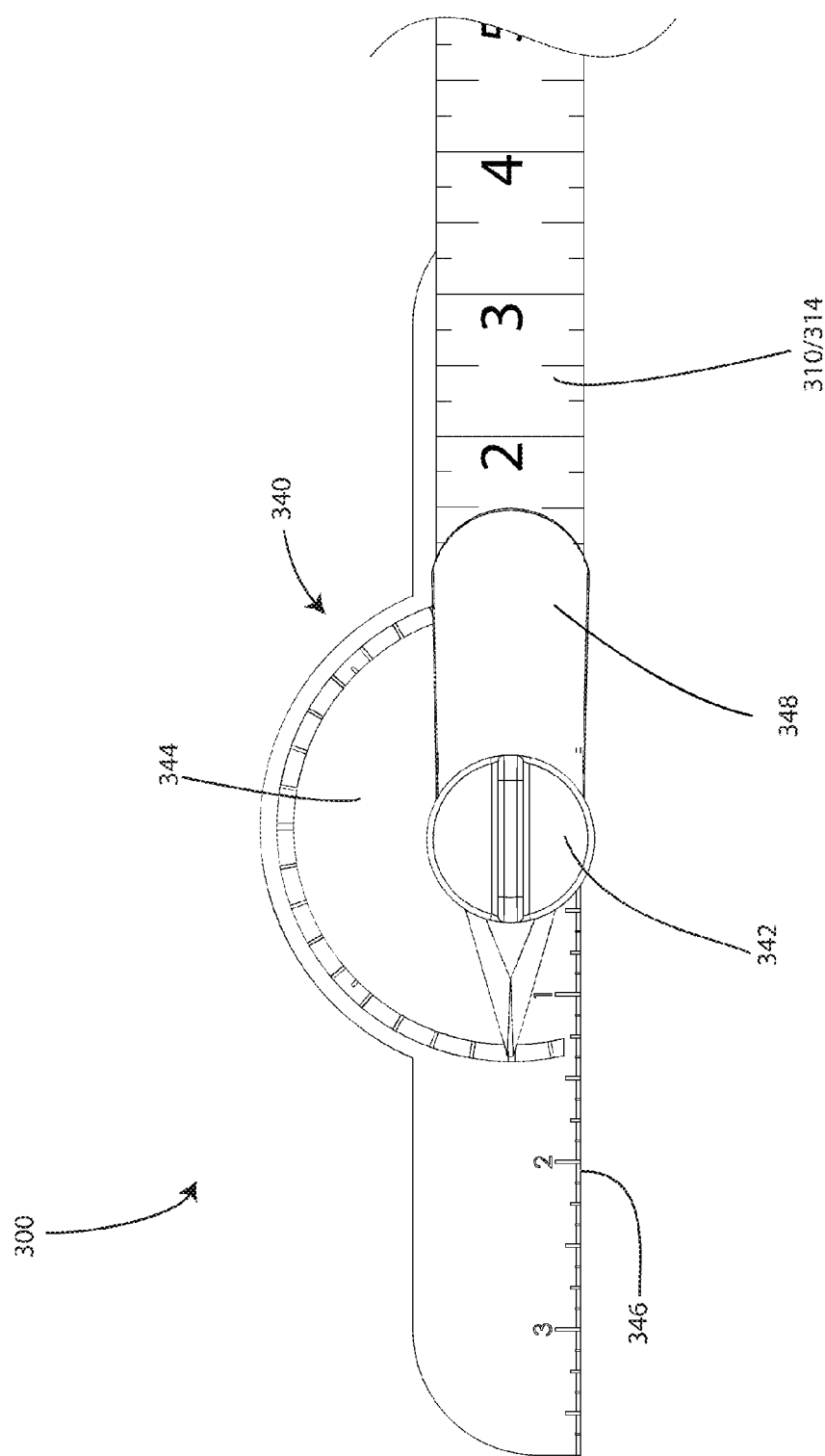
FIG. 10C is a partial top view of the measuring device of FIG. 9, wherein the measuring device is positioned at an angle of about 180 degrees.

As shown in FIGS. 10A-10C, the protractor portion 344 of the T-square head 340 is pivotally connected to the elongate, collapsible base associated with the measuring device 300. More specifically, an end of the base is press fit into a sleeve portion of tailpiece 348, although other suitable methods may be used to attach tailpiece 348 to the end of the base. As shown, the tailpiece 348 is pivotally attached to the protractor portion 344 with a bolt 350 and a knob fastener 342, however any suitable method known in the art may be used in the practice of the invention.

As shown in FIGS. 10A-10C, a straight edge portion 346 of the head 340 acts to hold the end of the base in place. The base may then be pivoted into various positions and at various angles relative to the straight edge portion 346 of the head 340. The pointer portion of tailpiece 348 is used with the protractor portion 344 of the head 340 to visually indicate the angle of the base relative to the straight edge portion 346 of the head. For example, as shown in FIG. 10B, the base is at about 90 degrees relative to the straight edge portion 346. As shown in FIG. 10C, the base is at about 180 degrees relative to the straight edge portion 346. The knob 342 may be loosened and tightened to adjust the angle of the base relative to the head 340.

The exemplary measuring devices shown and/or described herein may include other devices used for measuring. For example, the measuring device may further comprise a measurement marker, a level, a pencil, a caliper device, or the like. It should be apparent to those skilled in the art based on the present disclosure that these other devices may be used in any combination and with any embodiment of the measuring device described in this application.

For example, FIGS. 11A-11D and 12A-12D illustrate measuring devices 400, 500 having measurement markers 450, 550 for marking measurements. As shown, the measurement markers 450, 550 slidably attach to the measuring devices 400, 500 and may be slid along their length. The measurement markers 450, 550 further comprise a window portion 452, 552 and marking indicia 454, 554. The window portions 452, 552 allow the user to visually detect the length to be marked and align the indicia on the measuring devices 400, 500 with the marking indicia 454, 554 on the measurement markers 450, 550. The user may then mark the length above or below the measurement marker 450, 550. The exemplary measurement markers 450, 550 also have a surface that conforms to the contour of the self-extending member, e.g., measuring devices 400, 500, to orient the measurement marker 450, 550 with respect to the longitudinal axis of the self-extending member when the measurement marker 450, 550 is coupled thereto and aligned as shown.

The measurement marker may further comprise a magnetic material or include magnets for attaching the marker to the measuring device. As shown in FIG. 11C, magnets 470 are affixed with an adhesive in a cavity of the measurement marker 450. However, the magnets may be included by any suitable means known in the art, such as for example, overmolded as the measurement marker 450 is molded, or affixed to the measurement marker itself, e.g., affixed with adhesive. Further, the measurement marker may be configured to clip onto the measuring device. For example, as shown in FIGS. 12A-12D, measurement marker 550 is configured to clip, or snap, onto the device 500. The measurement marker 550 comprises flanges 556 configured to clip, or snap, onto the edges of the device 500 (see FIG. 12D). However, other suitable methods may be used to removably attach the measurement marker to the measuring device.

Figure 13C:
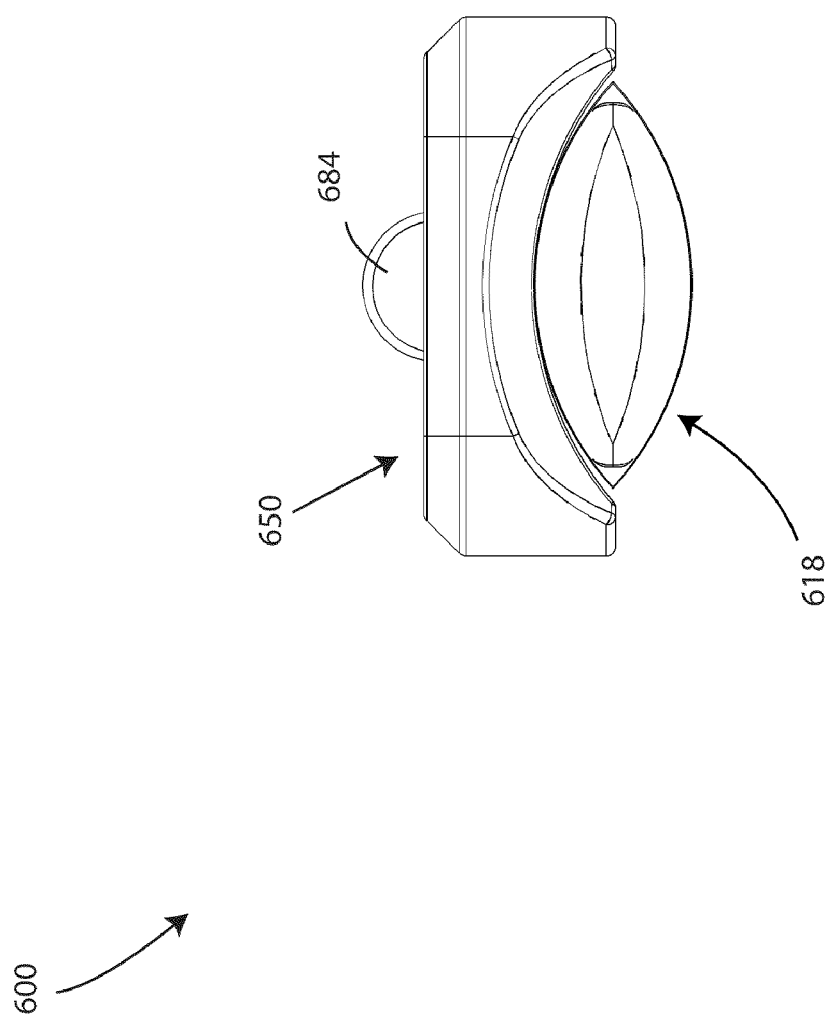

FIGS. 13A-13C illustrate a measuring device 600 according to an embodiment of the invention in which the measuring device comprises a leveling device 650 having a spirit or bubble level 684 for making accurate measurements. As shown, the leveling device 650 slidably attaches to the measuring device 600 and may be slid along its length. The level 684 is disposed within a window portion of the leveling device 650. However, it should be apparent to those skilled in the art that the level 684 may be attached to the leveling device 650 by any suitable means known in the art. As shown in FIG. 13B, similar to the measurement marker 450, magnets 670 are affixed with an adhesive in a cavity of the leveling device 650 for attaching the leveling device to the measuring device 600. However, the magnets 670 may be included by any suitable means known in the art, such as for example, overmolded as the leveling device 650 is molded or affixed to the leveling device itself, e.g., affixed with adhesive.

Figure 14E:
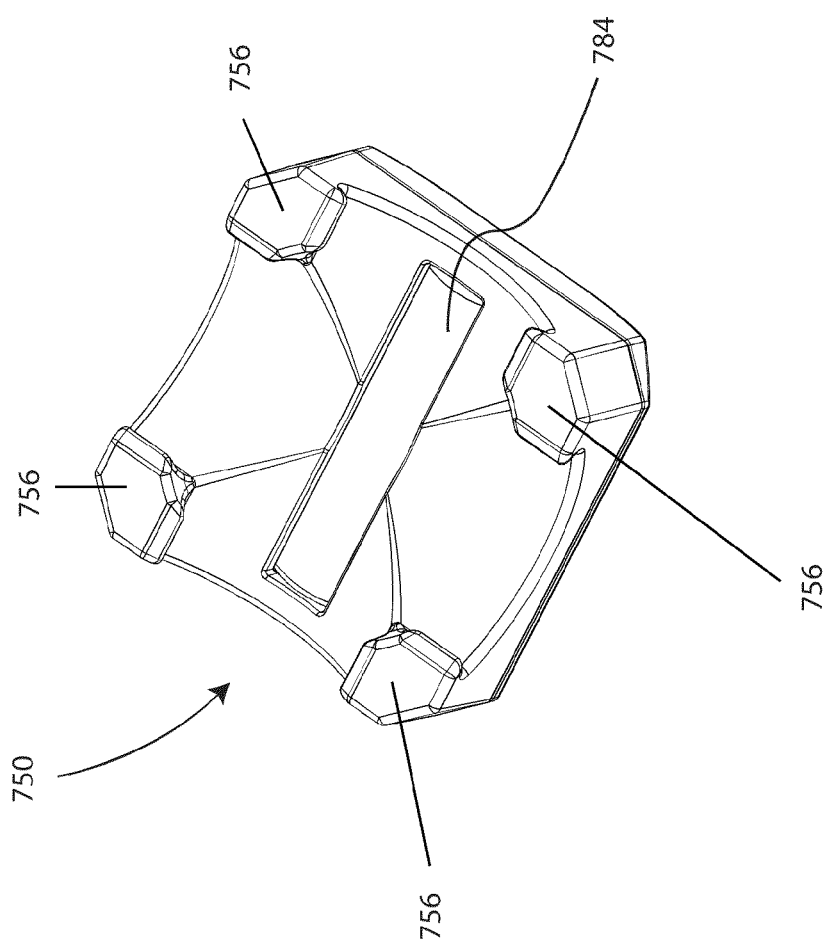

FIGS. 14A-14E illustrate a measuring device 700 according to an embodiment of the invention in which the measuring device comprises a leveling device 750 having a spirit or bubble level 784 for making accurate measurements. As shown, the leveling device 750 slidably attaches to the measuring device 700 and may be slid along its length. The level 784 is disposed within a window portion of the leveling device 750. As shown in FIG. 14E, similar to the measurement marker 550, leveling device 750 is configured to clip, or snap, onto the device 700. The leveling device 750 comprises flanges 756 configured to clip, or snap, onto the edges of the device 700.

The leveling device may be attached to the measuring device in either a level (horizontal) or plumb (vertical) configuration. As shown in FIGS. 14A and 14B, the leveling device 750 is attached to the measuring device 700 in a level or horizontal configuration. In the level configuration, the leveling device 750 is attached to the measuring device 700 such that the length of the spirit or bubble level 784 is parallel to the longitudinal axis of the self-extending member. In this configuration, the leveling device 750 may be used to level horizontal surfaces. As shown in FIGS. 14C and 14D, the leveling device 750 is attached to the measuring device 700 in a plumb or vertical configuration. In the plumb configuration, the leveling device 750 is attached to the measuring device 700 such that the length of the spirit or bubble level 784 is perpendicular to the longitudinal axis of the self-extending member. In this configuration, the leveling device 750 may be used to check that vertical surfaces are plumb.

The exemplary leveling devices 650, 750 shown in FIGS. 13A-14E have a surface that conforms to the contour of the self-extending member, e.g., measuring devices 600, 700, to align the level with respect to the longitudinal axis of the self-extending member when the leveling device 650, 750 is coupled thereto and aligned as shown. The leveling devices 650, 750 may also include marking indicia similar to the marking indicia 454, 554 on the measurement markers 450, 550. The marking indicia may be used to mark horizontal (e.g., level configuration) and vertical (e.g., plumb configuration) lines.

Figure 15B:
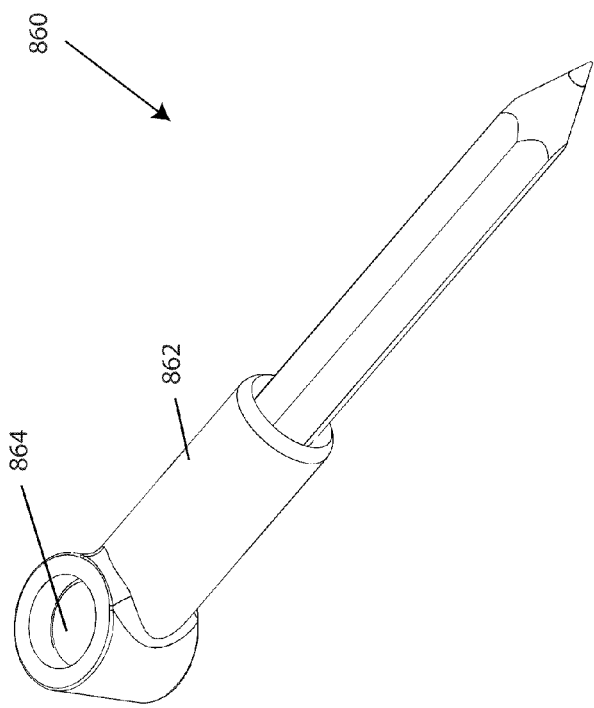
Figure 15C:
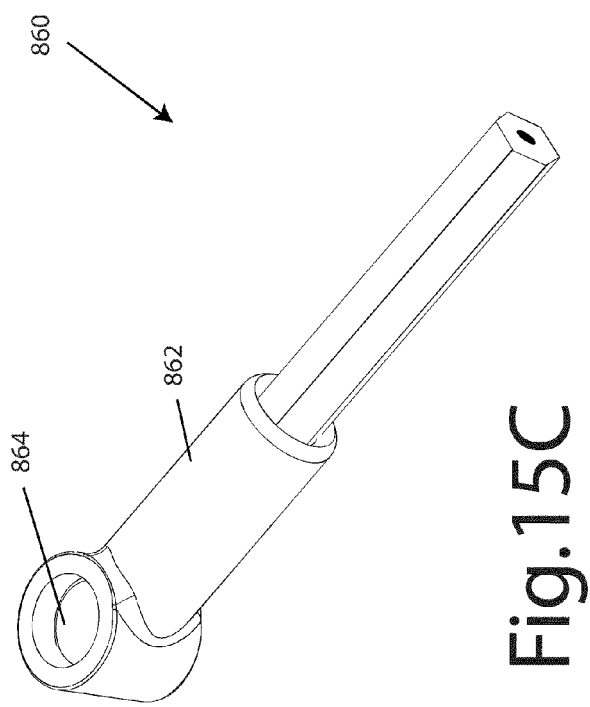

FIGS. 15A-15C show a measuring device 800 according to another embodiment of the invention in which the measuring device includes a pencil holder 860 removably attached to the device. In the exemplary embodiment shown, the pencil holder 860 comprises a magnet 864 or other means for removably attaching the pencil holder to the measuring device 800 (e.g., any of the other means for connecting the two ends of the collapsible devices, disclosed above). Further, the pencil holder 860 comprises a holder portion 862 for securing the pencil, pen, or the like. FIG. 15B shows a pencil secured in a ready to use position in the holder portion 862. FIG. 15C shows a pencil secured in a storage position in the holder portion 862.

FIGS. 16A and 16B show a measuring device 900 in an exemplary collapsed condition with a clip 950 attached. As shown, the clip 950 is made from a unitary piece of material, such as plastic, and is shaped to form a hanging portion 960 and an attachment portion 980. Further, the clip 950 is elastic and may be selectively opened and closed by the user. The ends of the clip 950 can move relative to each other to form an opening 970. The opening 970 allows the clip 950 to be threaded around a portion of an object, such as a belt, belt loop, tool box, tool belt, ladder, or any other object that may be used to hang the measuring device 900. The loop of the hanging portion 960 surrounds the portion of the object such that the clip 950 and the measuring device 900 can hang from the object. Further, as shown in FIG. 16A, the body of the measuring device 900 is inserted through the opening 970 and is held in place by the attachment portion 980 of the clip. The clip 950 may be made from other suitable materials, such as rubber or metal.

FIGS. 17A-17D show a measuring device 1000 having a site guide 1050 and a pivot axle 1060 attached to the measuring device. As shown, the site guide 1050 is made from a unitary piece of material, such as plastic. The site guide 1050 is configured to clip, or snap, to the body of the measuring device 1000 and may be slid along its length. The site guide 1050 is generally made of a transparent material such that the user may visually detect the length to be marked and align the indicia on the measuring device 1000 with marking indicia 1054 on the site guide. The site guide 1050 also has a surface that conforms to the contour of the self-extending member, e.g., the measuring device 1000, to orient the site guide with respect to the longitudinal axis of the self-extending member when the site guide is coupled thereto and aligned as shown. Further, the site guide 1050 comprises an opening 1056 in line with the marking indicia 1054. The pivot axle 1060 of FIGS. 17A-17D is made from a unitary piece of material, such as plastic, and comprises a slot 1068 that allows the pivot axle to attach to the measuring device 1000 around a flange 1024 of the end member 1016. The pivot axle 1060 also comprises an opening 1066.

Figure 17A:
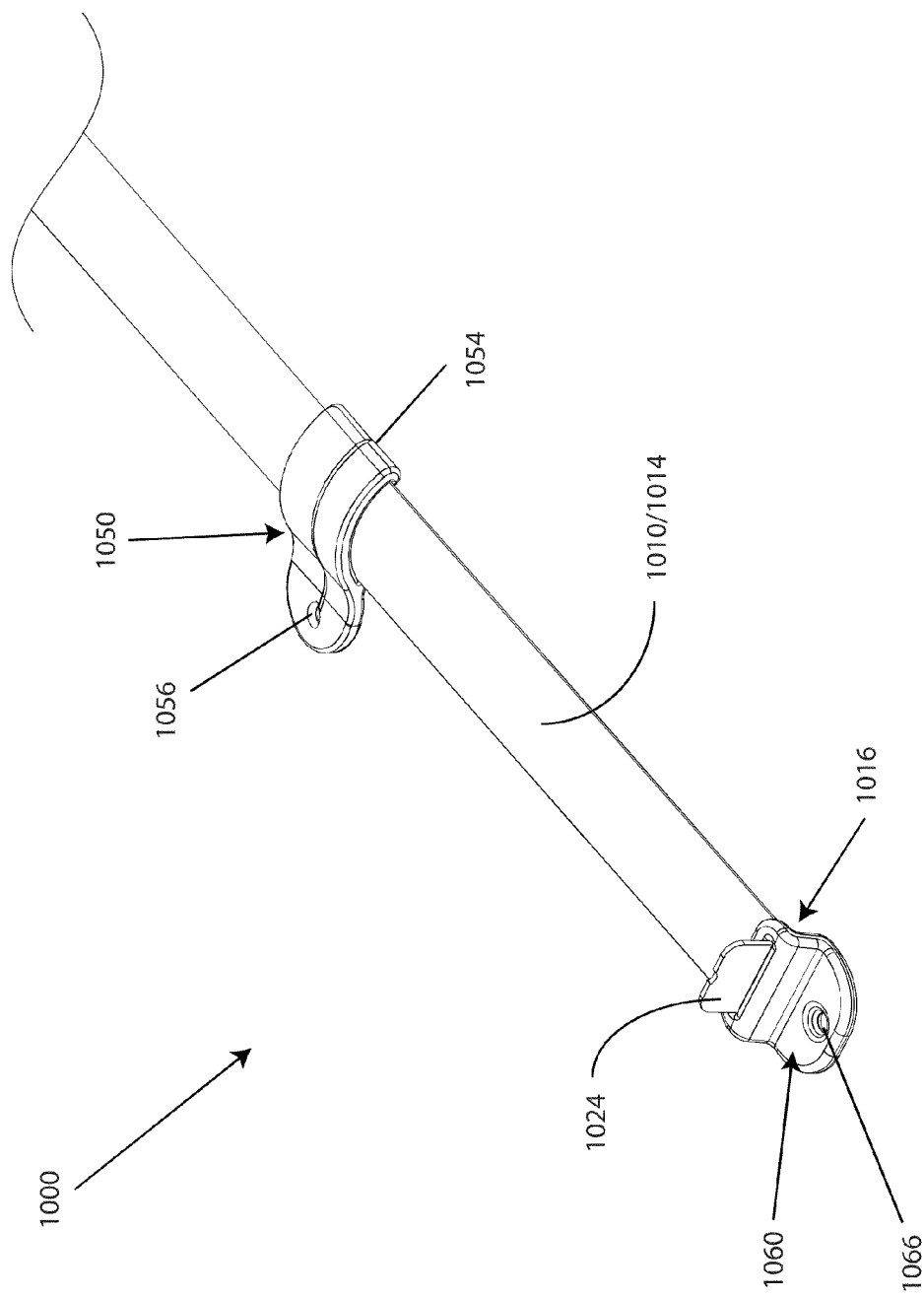
Figure 17B:
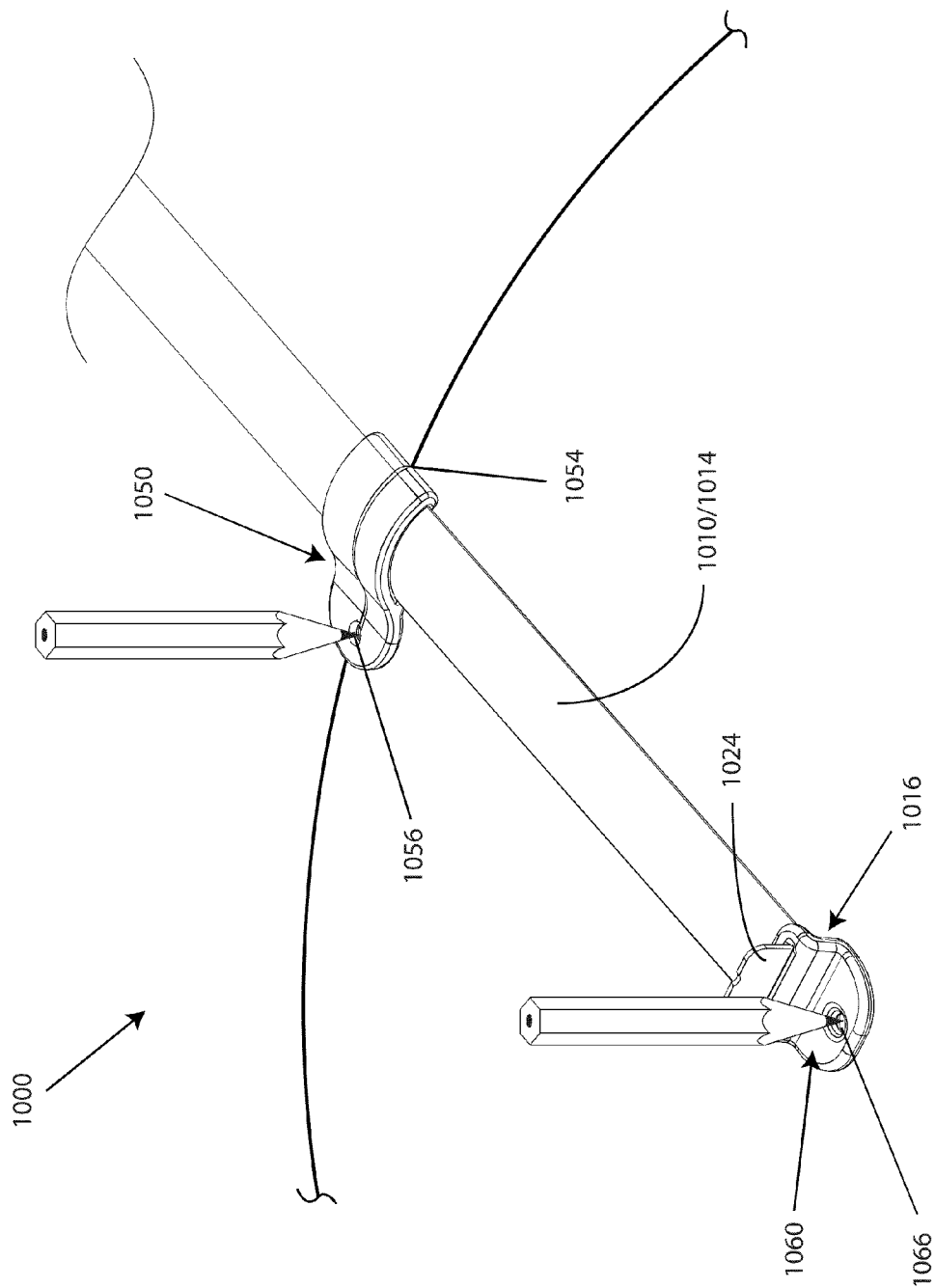

As shown in FIG. 17B, the site guide 1050 and pivot axle 1060 may be used to draw an arc or circle having a selected radius. For example, the user may adjust the site guide 1050 along the length of the measuring device 1000 and align the indicia on the measuring device with the marking indicia 1054 on the site guide at the selected radius. A first pencil, pen, or the like may be inserted through the opening 1066 in the pivot axle 1060 and act as a center or pivot of the arc or circle. A second pencil, pen, or the like may be inserted through the opening 1056 in the site guide 1050 and rotated about the center or pivot to draw an arc or circle having the selected radius.

FIGS. 18A and 18B show a measuring device 1100 according to an embodiment of the invention in which the measuring device includes a caliper device 1182 for measuring the width of an article. As known, a caliper is a device generally adapted for measuring the width of an article by disposing a pair of arms therearound, which arms are associated with a measuring device that indicates the amount of distance between the arms, and thereby the width of the article. As shown, the caliper device 1182 generally includes a stationary arm 1184 and an adjustable arm 1186 associated therewith. The stationary arm 1184 is a static component of the caliper device 1182 and is disposed along a terminal portion of the measuring device 1100, so as to generally define a component of the caliper device that is disposed on one side of an article to be measured. The adjustable arm 1186 is an arm movably associated with the measuring device 1180 in a manner that permits it to slide toward and away from the stationary arm 1184 for use in measuring. Each arm 1184, 1186 is a generally elongate feature, having generally straight inner vertical edges and, optionally, terminating in a pointed end. Thus, as the adjustable arm 1186 moves relative to the stationary arm 1184, they are maintained generally parallel relative to each other.

The adjustable arm 1186 of the caliper device 1182 may be associated with and movable relative to the measuring device 1100 through any appropriate means. For example, as shown in FIG. 18B, the adjustable arm 1186 is designed to clip onto the measuring device 1100 and slide along its length. Further, the adjustable arm 1186 may comprise magnetic material or magnets to hold the adjustable arm relative to the measuring device 1100. In other embodiments, the adjustable arm 1186 may be associated with and movable relative to the measuring device 1100 through a pair of wheels, each being rotatably disposed about lateral portions of the measuring device. Thus, manual actuation of the adjustable arm 1186 causes the wheels to move about the measuring device 1100, thereby permitting translation of the arm for measuring.

Further, the measuring device of the present application may also be carefully used as a cutting edge. As known, users often position a ruler and/or yardstick atop a surface to be cut and then use the ruler as a guide for cutting a straight line. The measuring device, given its elongate and generally straight configuration, is suitably applicable for use as such a cutting guide.

Figure 19:
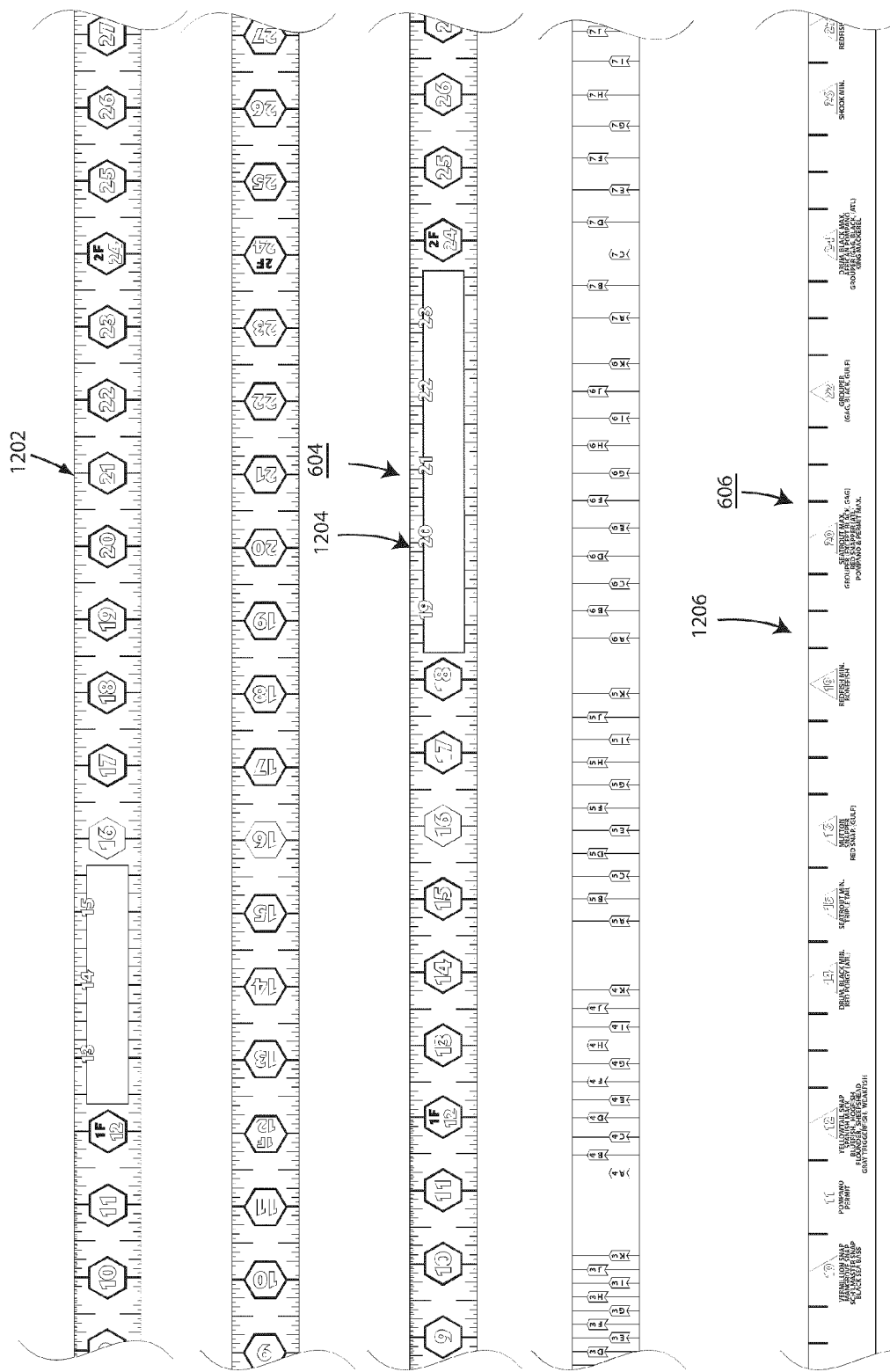
FIG. 19 shows top and bottom plan views of various exemplary measuring devices illustrating various types of indicia for measuring articles.

As shown in FIG. 19, the measuring device of the present application may include indicia for measuring various lengths and/or articles. For example, exemplary measuring device 1202 suitably includes printed along a surface thereof a plurality of graduated and incremental length indicating marks. The marks may suitably be provided in pairs, one set for English measuring units (e.g., inches, feet, yards, etc.) and another set for Metric measuring units (e.g., millimeters, centimeters, meters, etc.). As shown, the exemplary device 1202 comprises marks for English measuring units on both sides of the device. Similarly, exemplary measuring device 1204 comprises marks for English measuring units on one side of the device. However, the other side of the exemplary device 1204 comprises marks for measuring bricks. Exemplary measuring device 1206 comprises marks for measuring fish and includes size and bag limits for various species in the state of Florida. The marks and any other information pertinent thereto may suitably be directly printed on the elongated members, on the flexible housing, as a sticker applied to either of the foregoing, and the like.

It is to be appreciated that the measuring device of the present application, regardless of the application thereof, may be adapted for use as a promotional item and/or as an advertising-bearing item. For example, the flexible housing and/or elongated members may suitably bear any kind of information thereon, such as logos of a promoting organization, public safety messages (e.g., anti-drug messages), and the like. As known, stock items, such as pens, rulers and the like, are often imprinted with a company's advertising information and then distributed at no cost as a promotional item in an attempt to increase public awareness of the promotional company. The measuring device of the present application may suitably be adapted for use as any of a plurality of different promotional items, such as rulers, yardsticks, fanciful toys, and the like.

Exemplary embodiments of the invention include measuring devices that may be selectively configured between an extended condition and a collapsed condition and include a first elongated member, a second elongated member, a flexible housing, and a securing means for securing the measuring device in the collapsed condition. Each elongated member has a proximal end, a distal end, and a convex surface. The convex surface of each elongated member is flexible such that the members may bend about at least one bending axis of the measuring device. Further, the convex surface of each elongated member is resilient such that the convex surfaces are biased toward their stable convex shape and the measuring device is biased toward the extended condition, e.g., spring biased toward the extended condition. The first and second elongated members are disposed within the flexible housing forming a covered pair having a proximal end and a distal end. The apex of the convex surface of the first elongated member is opposite the apex of the convex surface of the second elongated member when the members are disposed within the flexible housing. Optionally, the covered pair may bend at virtually any point between a first point near the distal end of the covered pair and a second point near the proximal end of the covered pair. Each elongated member widens and flattens as the covered pair bends. Further, the members are permitted to slide relative to each other by less than ⅛th of an inch when disposed within the flexible housing.

In exemplary embodiments of the invention, the measuring device further includes any one of a magnet, a strap, a cord, a snap, a pin, a latch, an elastic member, hook and loop fasteners, a clip, etc. for securing the measuring device in the collapsed condition. Further, the measuring device includes at least one end member attached to at least one end of the covered pair. The at least one end member includes any one of a cap, a metal tab, a t-square, and a hanging clip. The device may be secured in the collapsed condition such that the covered pair has any one of: at least one bend with the proximal end and the distal end of the covered pair secured; at least two bends with the proximal end and the distal end of the covered pair secured and a first bend secured to one of the proximal end or the distal end of the covered pair; at least two bends with the proximal end of the covered pair secured to a first bend and the distal end of the covered pair secured to a second bend; and at least two bends with the proximal end and the distal end of the covered pair secured to one of the elongated members.

In yet another embodiment of the invention, the elongated members are permitted to slide relative to each other by less than ⅛th of an inch when disposed within the flexible housing. Further, in still another embodiment of the invention, the measuring device includes at least one magnet securing the measuring device in the collapsed condition.

Although the invention has been described with regard to certain preferred example embodiments, it is to be understood that the present disclosure has been made by way of example only, and that improvements, changes and modifications in the details of construction and the combination and arrangement of parts may be resorted to without departing from the spirit and scope of the invention. For example, any of the various accessories, embodiments, etc. shown in connection with self-extending members configured as measurement devices may be used with generic self-extending members described herein (i.e., without any measurement indicia). Such improvements, changes and modifications within the skill of the art are intended to be covered by the scope of the present disclosure.

I claim:

1. A measuring device that may be selectively configured between an extended condition and a collapsed condition, comprising:
  a first and a second elongated member, each member having a proximal end, a distal end, and a convex surface, wherein the convex surface of each member is flexible such that the members may bend about at least one bending axis of the measuring device and resilient such that the convex surfaces are biased toward their stable convex shape and the measuring device is biased toward the extended condition;
  a flexible housing, wherein the first and the second members are disposed within the flexible housing forming a covered pair having a proximal end and a distal end, wherein the apex of the convex surface of the first member is opposite the apex of the convex surface of the second member when the members are disposed within the flexible housing;
  a securing means for securing the measuring device in the collapsed condition, wherein the securing means includes at least one magnet; and
  a measuring means.

2. The measuring device of claim 1, wherein a pair of magnets secure the measuring device in the collapsed condition.

3. The measuring device of claim 2, wherein the device is capable of being secured in the collapsed condition such that the covered pair has at least two bends with substantially straight portions between the bends and the proximal end and the distal end of the covered pair secured and a first bend secured to one of the proximal end or the distal end of the covered pair.

4. The measuring device of claim 1, wherein each elongated member comprises a first longitudinal edge and a second longitudinal edge, wherein the first longitudinal edge of the first elongated member abuts the first longitudinal edge of the second elongated member and the second longitudinal edge of the first elongated member abuts the second longitudinal edge of the second elongated member.

5. The measuring device of claim 4, wherein the longitudinal edges of first elongated member and the longitudinal edges of second elongated member move laterally as the members bend about the at least one bending axis of the measuring device.

6. The measuring device of claim 4, wherein the first longitudinal edge of the first elongated member and the first longitudinal edge of the second elongated member move in the opposite lateral direction than the second longitudinal edge of the first elongated member and the second longitudinal edge of the second elongated member as the elongated members bend about the at least one bending axis of the measuring device.

7. The measuring device of claim 4, wherein the longitudinal edges of first elongated member move independently of the longitudinal edges of second elongated member as the elongated members bend about the at least one bending axis of the measuring device.

8. The measuring device of claim 1, wherein the device is capable of being secured in the collapsed condition such that the covered pair has any of: at least one bend with the proximal end and the distal end of the covered pair secured; at least two bends with substantially straight portions between the bends and the proximal end and the distal end of the covered pair secured and a first bend secured to one of the proximal end or the distal end of the covered pair; at least two bends with substantially straight portions between the bends and the proximal end of the covered pair secured to a first bend and the distal end of the covered pair secured to a second bend; and at least two bends with substantially straight portions between the bends and the proximal end and the distal end of the covered pair secured to one of the elongated members.

9. The measuring device of claim 1, wherein at least a portion of the first elongated member and at least a portion of the second elongated member are free relative to each other within the flexible housing.

10. The measuring device of claim 1, wherein the elongated members are permitted to slide laterally relative to each other when disposed within the flexible housing.

11. The measuring device of claim 10, wherein the elongated members are permitted to slide laterally relative to each other by less than 1/8th of an inch when disposed in the flexible housing.

12. The measuring device of claim 1, wherein at least one end member is at least partially disposed within at least one end of the covered pair between the elongated members.

13. The measuring device of claim 12, wherein the at least one end member includes any one of a cap, a metal tab, a t-square, and a hanging clip.

14. The measuring device of claim 1, wherein the securing means includes any one or any combination of any two or more of a magnet, a strap, a cord, a snap, a pin, a latch, an elastic member, and a clip for securing the measuring device in the collapsed condition.

15. The measuring device of claim 1, wherein the first and second elongated members and the flexible housing cooperate so that the device in the extended condition is self-supporting and does not bend under the force of gravity in a longitudinally horizontal position when held by hand at one end in an orientation in which gravity would tend to bend the device from its extended condition.

16. The measuring device of claim 1, wherein the first and second elongated members and the flexible housing cooperate to form a hollow chamber extending longitudinally from one end of the device to the other.

17. The measuring device of claim 1, wherein the first and second elongated members and the flexible housing cooperate to permit the device to be bent into different collapsed positions that are about ½ the overall length of the extended device, about ⅓ the overall length of the extended device, and ¼ the overall length of the extended device.

18. A measuring device of claim 1, wherein the first and second elongated members, the flexible housing, and securing means cooperate to permit the device to be secured in different collapsed positions that are about ½ the overall length of the extended device, about ⅓ the overall length of the extended device, and ¼ the overall length of the extended device.

19. The measuring device of claim 1, wherein the device comprises measurement indicia permitting distances to be measured.

20. The measuring device of claim 1, wherein the device comprises indicia permitting measurements to be taken.

21. The measuring device of claim 1 further comprising any one or more of: a level for making measurements; a measurement marker for marking measurements; a site guide; a pivot axle; a magnetic pencil for marking measurements; and a caliper device for measuring the width of an article.

22. A measuring device that may be selectively configured between an extended condition and a collapsed condition, comprising:
a first and a second elongated member, each member having a proximal end, a distal end, and a convex surface, wherein the convex surface of each member is flexible such that the members may bend about at least one bending axis of the measuring device and resilient such that the convex surfaces are biased toward their stable convex shape and the measuring device is biased toward the extended condition;
a flexible housing, wherein the first and the second members are disposed within the flexible housing forming a covered pair having a proximal end and a distal end, wherein the apex of the convex surface of the first member is opposite the apex of the convex surface of the second member when the members are disposed within the flexible housing;
a securing means for securing the measuring device in the collapsed condition, wherein the securing means includes at least one magnet;
a measuring means;
wherein the covered pair may bend at virtually any point between a first point near the distal end of the covered pair and a second point near the proximal end of the covered pair; and
wherein each member widens and flattens as the covered pair bends.

23. The measuring device of claim 22, wherein the members are permitted to slide relative to each other by less than ⅛th of an inch when disposed within the flexible housing.

24. The measuring device of claim 22, wherein a pair of magnets secure the measuring device in the collapsed condition.

25. A measuring device that may be selectively configured between an extended condition and a collapsed condition, comprising:

- a first and a second elongated member, each member having a proximal end, a distal end, and a convex surface, wherein the convex surface of each member is flexible such that the members may bend about at least one bending axis of the measuring device and resilient such that the convex surfaces are biased toward their stable convex shape and the measuring device is biased toward the extended condition;
- a flexible housing, wherein the first and the second members are disposed within the flexible housing forming a covered pair having a proximal end and a distal end, wherein the apex of the convex surface of the first member is opposite the apex of the convex surface of the second member when the members are disposed within the flexible housing;
- at least one magnet for securing the measuring device in the collapsed condition;
- a measuring means;
- at least one end member attached to at least one end of the covered pair, wherein the at least one end member includes any one of a cap, a metal tab, a t-square, and a hanging clip; and
- wherein the covered pair may bend at virtually any point between a first point near the distal end of the covered pair and a second point near the proximal end of the covered pair;
- wherein each member widens and flattens as the covered pair bends; and
- wherein the device is capable of being secured in the collapsed condition such that the covered pair has any of: at least one bend with the proximal end and the distal end of the covered pair secured; at least two bends with substantially straight portions between the bends and the proximal end and the distal end of the covered pair secured and a first bend secured to one of the proximal end or the distal end of the covered pair; at least two bends with substantially straight portions between the bends and the proximal end of the covered pair secured to a first bend and the distal end of the covered pair secured to a second bend; and at least two bends with substantially straight portions between the bends and the proximal end and the distal end of the covered pair secured to one of the elongated members.

* * * * *